United States Patent
Watanabe et al.

(10) Patent No.: US 9,906,476 B2
(45) Date of Patent: Feb. 27, 2018

(54) FILTER RULE GENERATION APPARATUS AND FILTER RULE GENERATION METHOD

(71) Applicant: FUJITSU LIMITED, Kawasaki-shi, Kanagawa (JP)

(72) Inventors: Yukihiro Watanabe, Kawasaki (JP); Yasuhide Matsumoto, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 217 days.

(21) Appl. No.: 14/851,198

(22) Filed: Sep. 11, 2015

(65) Prior Publication Data

US 2016/0099898 A1   Apr. 7, 2016

(51) Int. Cl.
| | | |
|---|---|---|
| G06F 15/16 | (2006.01) | |
| H04L 12/58 | (2006.01) | |
| H04L 12/24 | (2006.01) | |
| H04L 12/26 | (2006.01) | |

(52) U.S. Cl.
CPC .......... *H04L 51/12* (2013.01); *H04L 41/0604* (2013.01); *H04L 41/0631* (2013.01); *H04L 43/02* (2013.01)

(58) Field of Classification Search
CPC .... H04L 43/00–43/028; H04L 41/0604; H04L 41/0631–41/065
See application file for complete search history.

(56) References Cited

U.S. PATENT DOCUMENTS

| | | | | |
|---|---|---|---|---|
| 7,131,037 B1* | 10/2006 | LeFaive | .............. | H04L 41/0631 714/46 |
| 7,721,152 B1* | 5/2010 | Joshi | ................... | G06F 11/0709 714/15 |
| 9,632,861 B1* | 4/2017 | Watanabe | ............. | G06F 11/079 |
| 2005/0283680 A1* | 12/2005 | Kobayashi | .......... | G06F 11/3636 714/39 |
| 2008/0025227 A1* | 1/2008 | Puttu | ................... | H04L 12/1895 370/244 |
| 2011/0208679 A1* | 8/2011 | Watanabe | ........... | G06F 11/0751 706/12 |
| 2012/0151282 A1* | 6/2012 | Watanabe | ............. | G06F 11/076 714/49 |

(Continued)

FOREIGN PATENT DOCUMENTS

| | | |
|---|---|---|
| JP | 2003-216869 | 7/2003 |
| JP | 2014-106851 | 6/2014 |

*Primary Examiner* — Brendan Higa
(74) *Attorney, Agent, or Firm* — Fujitsu Patent Center

(57) ABSTRACT

A filter rule generation apparatus includes a storage unit and a processor. The storage unit is configured to store instructions. The processor, in accordance with each of the instructions stored on the storage unit, executes a process that causes the filter rule generation apparatus to perform extracting a co-occurrence message group per system, based on a co-occurrence probability, from a plurality of logs in which messages are accumulated, the messages being generated within systems, first generating value information representing a degree of similarity in operation between the systems, based on the extracted co-occurrence message group, clustering the systems, based on the value information, and second generating a rule for extracting messages from the logs of the systems included in each cluster, based on the co-occurrence message group in the cluster generated by the clustering.

18 Claims, 29 Drawing Sheets

(56) References Cited

U.S. PATENT DOCUMENTS

2014/0006871 A1* 1/2014 Lakshmanan ........ H04L 41/065
　　　　　　　　　　　　　　　　　　　　　714/37
2014/0149524 A1　5/2014 Watanabe et al.

* cited by examiner

FIG. 4

SYSTEM A

| MESSAGE PATTERN | OCCURRENCE INTERVAL |
|---|---|
| [1, 2, 3] | 6±2 MIN |
| [1*] (REPETITION OF 1) | 2±1 MIN |
| [1, 3] | 4±2 MIN |

ELEMENT COUNT:
n(A)=3

SYSTEM B

| MESSAGE PATTERN | OCCURRENCE INTERVAL |
|---|---|
| [1, 2, 3] | 7±2 MIN |
| [1*] (REPEAT OF 1) | 5±1 MIN |
| [1, 3] | 4±1 MIN |
| [1, 4] | 2±2 MIN |

ELEMENT COUNT:
n(B)=4

FIG. 13

MESSAGE LOG MANAGEMENT REGISTER

| MESSAGE LOG FILE NAME | SYSTEM SPECIFYING INFORMATION |
|---|---|
| FILE_SYS001_20120313_APP01_001 | Sys001 |
| FILE_SYS002_20120313_APP04_001 | Sys002 |
| FILE_SYS001_20120313_APP01_002 | Sys001 |
| FILE_SYS003_20120313_DB01_001 | Sys003 |
| FILE_SYS003_20120313_DB01_001 | Sys003 |
| . . | . . |

FIG. 14

| MESSAGE LOG FILE NAME | | |
|---|---|---|
| FILE_SYS001_20120313_APP01_001 | | |

| ID | TIME | MESSAGE TYPE | MESSAGE |
|---|---|---|---|
| 68563214 | 2012-03-13T10:31:02-09:00 | 1 | ServerView RAID, 0, 10526, vcsv01, Adapter [172.26.20.23] LSI 1064SASIME-3030 (8) : Adapter missing after reboot,FAILURE=SERVER BLADE, MODEL=BX620 S5 |
| 68563215 | 2012-03-13T10:35:28-09:00 | 3 | machine4:FJSVcsl:A:Rack#0-PCI/DISKBOX#0: SCF:Correctable error count over flow |
| 68563216 | 2012-03-25T21:00:18-09:00 | 10 | Adapter FTS RAID Ctrl SAS 6G 5/6 512MB (D2616) (0) : Disk (4) missing after reboot (Server HOST-SERVER), MIB="",SPC="",SVOMHOST="Host-Server", FROM="SERVER_VIEW" |
| .. | .. | .. | .. |

FIG. 15

SINGLE SYSTEM LOG CO-OCCURRENCE RELATION TABLE

| SYSTEM NAME | | |
|---|---|---|
| Sys002 | | |
| CO-OCCURRENCE MESSAGE PATTERN | PATTERN OCCURRENCE COUNT | INTRA-PATTERN MESSAGE DISTRIBUTION TIME WIDTH (MIN) |
| [1, 2, 3] | 165 | 7±2 |
| [1*] (REPETITION OF 1) | 120 | 5±1 |
| [1, 3] | 25 | 4±1 |
| [1, 4] | 62 | 2±2 |

FIG. 16

INTEGRATED SYSTEM LOG CO-OCCURRENCE RELATION TABLE

| INTEGRATED SYSTEM NAME | | |
|---|---|---|
| Sys001, Sys002, Sys100 | | |
| CO-OCCURRENCE MESSAGE PATTERN | PATTERN OCCURRENCE COUNT | INTRA-PATTERN MESSAGE DISTRIBUTION TIME WIDTH (MIN) |
| [1, 2, 3] | 2531 | 7±2 |
| [1*] (REPETITION OF 1) | 752 | 8±4 |
| [1, 3] | 648 | 3±1 |
| [1, 4] | 126 | 2±2 |
| [2, 4] | 88 | 8±3 |

FIG. 17

CATEGORIZED RESULT SIMILARITY DEGREE

|  | Sys001 | Sys002 | Sys003 | ... | Sys098 | Sys099 | Sys100 |
|---|---|---|---|---|---|---|---|
| Sys001 | 0 |  |  | ... |  |  |  |
| Sys002 | 3 | 0 |  | ... |  |  |  |
| Sys003 | 10 | 9 | 0 | ... |  |  |  |
| ⋮ | ... | ... | ... | ... | ... | ... | ... |
| Sys098 | 7 | 6 | 8 | ... | 0 |  |  |
| Sys099 | 8 | 5 | 12 | ... | 2 | 0 |  |
| Sys100 | 2 | 3 | 14 | ... | 10 | 6 | 0 |

FIG. 18

| CLUSTER ID | DEGREE OF SIMILARITY | SIMILAR SYSTEM |
|---|---|---|
| C01 | 2 | sys001<br>sys100 |
| C02 | 3 | C01<br>sys002 |
| C03 | - | sys003 |
| C04 | 2 | sys098<br>sys099 |
| ⋮ | ⋮ | ⋮ |

FILTER RULE GENERATION APPARATUS AND FILTER RULE GENERATION METHOD

CROSS-REFERENCE TO RELATED APPLICATION

This application is based upon and claims the benefit of priority of the prior Japanese Patent Application No. 2014-205805, filed on Oct. 6, 2014, the entire contents of which are incorporated herein by reference.

FIELD

The embodiments discussed herein are related to a filter rule generation apparatus and a filter rule generation method.

BACKGROUND

Such an operation management method exists as to notify an administrator of a message conforming to a predetermined monitoring rule in messages that are output from a monitoring target system including a plurality of systems. FIG. 1 illustrates an operation management procedure in the monitoring target system including the plurality of systems. The monitoring target system in FIG. 1 includes the plurality of systems, e.g., an information processing apparatus group 301 with their machine types and makers being different from each other. A monitoring apparatus 302 monitors the monitoring target system and collects messages issued from the information processing apparatuses within the monitoring target system. An operator apparatus 304 or another equivalent apparatus notifies the monitoring apparatus 302 of a collection target operation message beforehand, and the monitoring apparatus 302 retains this message as a monitoring rule. The monitoring apparatus 302 collects the operation messages each corresponding to the monitoring rule from the systems.

A filter processing unit of the monitoring apparatus 302 itself or a filter processing apparatus 303 operating in linkage with the monitoring apparatus 302 performs filtering the messages for reducing a load on a monitoring operator who administers the monitoring target system. The filtering is a process of, e.g., integrating, aggregating or selecting the collected messages according to the filtering rule. As a result of filtering, an operator apparatus 304 operated by the monitoring operator is notified of a smaller quantity of messages as a monitoring target event than the messages issued from the monitoring target system. The monitoring operator reports, to a person in charge, an event being determined about whether the event needs being handled in the notified monitoring target events after the filtering.

However, a large quantity of messages occur within the system including the plurality of information processing apparatuses as the case may be. There are the messages that are periodically transmitted and the message group occurring due to the same cause in the messages conforming to the predetermined monitoring rule, and a plurality of or, depending on the case, a large quantity of messages containing the same contents are output. Proposed consequently is a mechanism capable of aggregating the message group or selecting a small number of messages and outputting thus-processed message group or messages with respect to the message group generated based on the same cause and the message group containing the same content and occurring a plural number of times. The mechanism configured to aggregate the message group or to select the small number of messages involves generating, e.g., a filter rule beforehand and outputting the messages based on the filter rule.

FIG. 2 illustrates a processing instance, in which the information processing apparatus generates the filter rule, aggregates the message group containing the same content and occurring the plural number of times or selects the small number of messages, and outputs the thus-processes message group or messages. In the monitoring target system of FIG. 2, the information processing apparatus to monitor the monitoring target system accumulates the messages coming from the information processing apparatus group 301 in a message log. The information processing apparatus calculates a co-occurrence probability between messages, a, b, c and other equivalent messages accumulated in the message log. Herein, the term [co-occurrence] connotes that when a certain message occurs, another message occurs concomitantly with the occurrence of the former message. The term [co-occurrence probability] is an index indicating a probability of co-occurrence between the messages and is also said to be an index indicating a relationship between the messages. The information processing apparatus selects, as a monitoring target event, any one of the messages with the co-occurrence probability conforming to predetermined criteria between the messages, and discards other messages. This is because the messages with the co-occurrence probability conforming to the predetermined criteria can be determined to be the plurality of messages occurring due to the same cause. The mechanism described above enables restraint of an output count of messages conforming to the monitoring rule.

DOCUMENTS OF PRIOR ARTS

Patent Document

[Patent document 1] Japanese Laid-open Patent Publication No. 2003-216869
[Patent document 2] Japanese Laid-open Patent Publication No. 2014-106851

SUMMARY

One aspect of the technology of the disclosure is exemplified by a filter rule generation apparatus. The filter rule generation apparatus includes a storage unit configured to store instructions and a processor, in accordance with each of the instructions stored on the storage unit, executing a process that causes the filter rule generation apparatus to perform extracting a co-occurrence message group per system, based on a co-occurrence probability, from a plurality of logs in which messages are accumulated, the messages being generated within systems, first generating value information representing a degree of similarity in operation between the systems, based on the extracted co-occurrence message group, clustering the systems, based on the value information, and second generating a rule for extracting messages from the logs of the systems included in each cluster, based on the co-occurrence message group in the cluster generated by the clustering.

The object and advantages of the invention will be realized and attained by means of the elements and combinations particularly pointed out in the claims. It is to be understood that both the foregoing general description and the following detailed description are exemplary and explanatory and are not restrictive of the invention.

BRIEF DESCRIPTION OF DRAWINGS

FIG. 4 is a diagram illustrating an instance of a message pattern of a message log;

FIG. 13 is a diagram illustrating a message log management register;

FIG. 14 is a diagram illustrating a structure and data of the message log;

FIG. 15 is a diagram illustrating data of a single system log co-occurrence relation;

FIG. 16 is a diagram illustrating data of an integrated system log co-occurrence relation;

FIG. 17 is a diagram illustrating a data example of a degree of similarity of categorized results;

FIG. 18 is a diagram illustrating a similar system table;

DESCRIPTION OF EMBODIMENTS

An information processing apparatus according to one embodiment will hereinafter be described with reference to the drawings. A configuration of the following embodiment is an exemplification, and the present information processing apparatus is not limited to the configuration of the embodiment.

Example

The filter rule is generated by analyzing the log obtained by operating the monitoring target system for a fixed or longer period and accumulating the messages. The accumulation of the messages takes a considerable length of time, and the filter rule is not applied till generating the filter rule, resulting in outputting the overlapped messages for a fixed period after a start of operating the monitoring target system in some cases.

An Example will exemplify a monitoring target system including a plurality of systems. More specifically, such a process is exemplified that the information processing apparatus monitoring a message within the monitoring target system obtains a message co-occurrence relation earlier than hitherto, and generates a filter rule applied to a message that is output from the monitoring target system. The information processing apparatus according to the Example integrates message logs that are output from systems being similar in terms of behavior in the plurality of systems included in the monitoring target system, thereby increasing a quantity of messages for obtaining the co-occurrence relation of the messages issued from the respective systems earlier than hitherto. The "plurality of systems included in the monitoring target system" may be called also subsystems in the sense of "being included in the monitoring target system". The information processing apparatus according to the Example is one instance of a filter rule generation apparatus.

<Instance of Integration of Message Logs>

Figure 1:
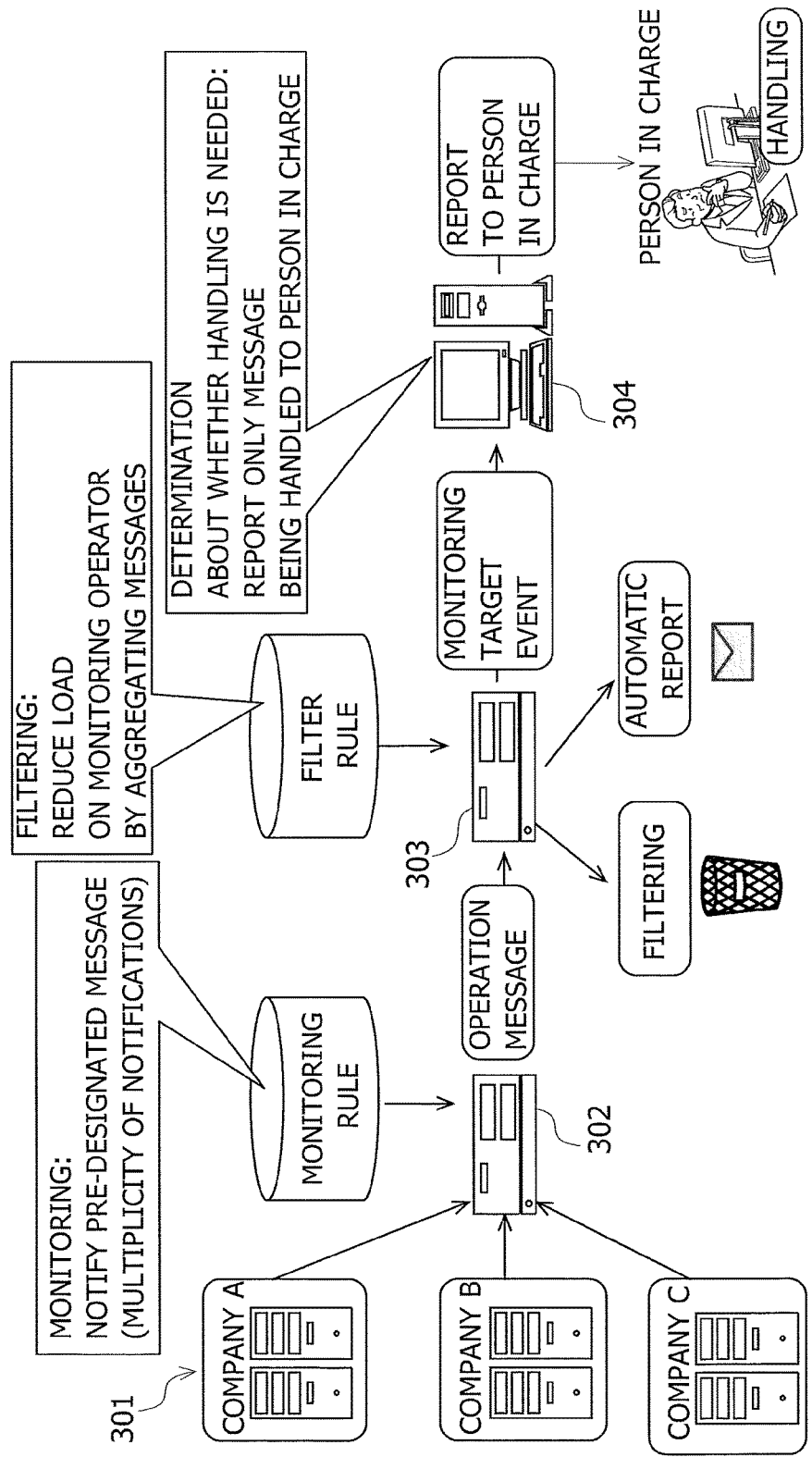
FIG. 1 is a diagram illustrating an operation management procedure in a monitoring target system including a plurality of systems.
Figure 2:
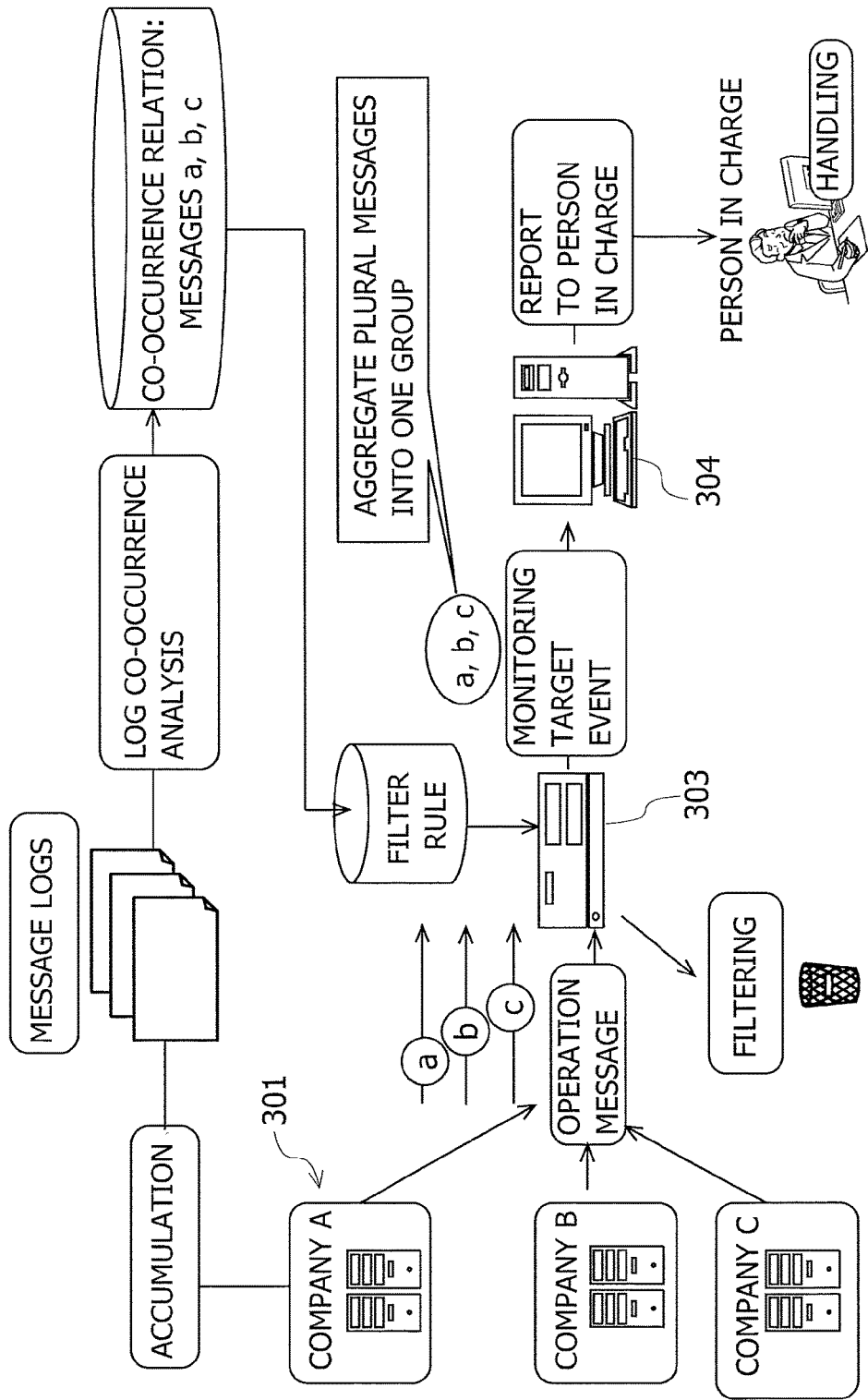
FIG. 2 is a diagram illustrating a processing instance in which an information processing apparatus generates a filter rule, aggregates a message group occurring a plural number of times, or selects and outputs a small number of messages.
Figure 3:
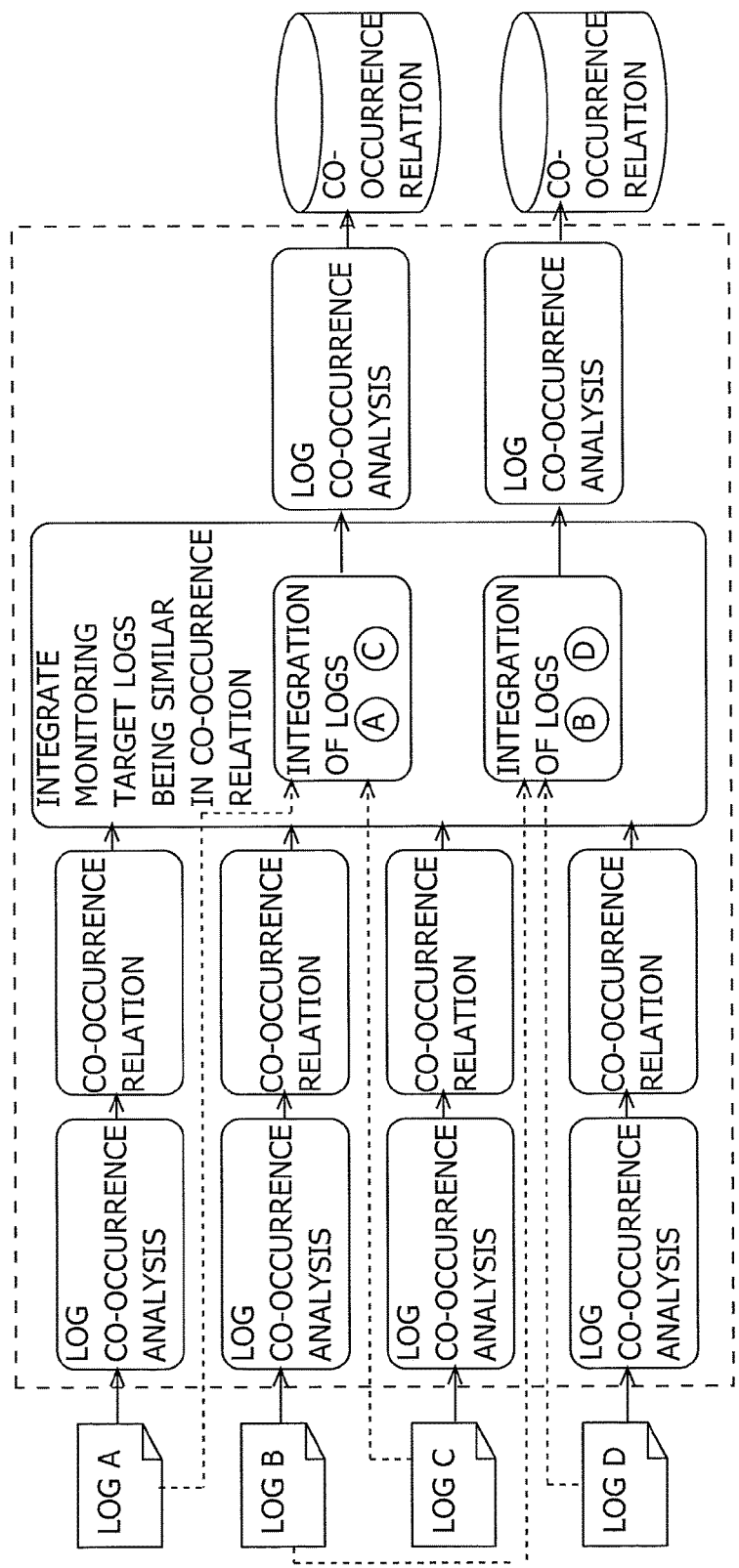
FIG. 3 is a diagram illustrating a data flow of a process of effectively increasing a target data quantity for analyzing a co-occurrence relation between messages.

FIG. 3 illustrates data flows of processes of effectively increasing a target data quantity for analysing the message co-occurrence relation by integrating the messages given from the systems within the monitoring target system. FIG. 3 depicts the data flows of message logs A, B, C and D. In FIG. 3, the message logs are simply termed "logs".

In FIG. 3, the message logs A, B, C and D are deemed as files of the messages being output from the systems A, B, C and D within the monitoring target system. However, the processes of the present Example can be applied even when each of the systems outputs a plurality of message logs. For instance, the system A outputs message logs a1, a2, . . . and other equivalent logs, in which case it may be sufficient that these message logs a1, a2, . . . are integrated into one message log A. The same process is applied to the message logs B, C and D.

During an initial phase of starting an operation of the monitoring target system, such a status possibly occurs that a sufficient quantity of messages for analyzing the message co-occurrence relation in the respective message logs are not accumulated in the message logs A, B, C and D. The information processing apparatus according to the Example effectively increases the message quantity for analyzing the message co-occurrence relation when the respective message logs in FIG. 3 do not yet accumulate the sufficient quantity of messages.

For example, it can be considered to integrate the message logs of the plurality of systems having the same configuration. A desirable result is not, however, acquired simply by collecting the logs of the systems having the same configuration as the case may be. Such a case is assumed that the multiple systems, e.g., a cloud A and a cloud B, have the same application configuration. As the case may be, a behavior of the application is, however, different even by using the same application, depending on when building up an application environment on the cloud A and when building up the application environment on the cloud B.

For instance, when a user changes a log output setting of the application, the message co-occurrence relation appearing in the message logs varies as the case may be even if the application configuration is the same. Further, the message co-occurrence relation appearing in the message logs varies as the case may be even if the application configuration is the same, depending on the system having a high access frequency from outside and the system having the low access frequency.

Such being the case, the information processing apparatus according to the Example puts a focus on a point that there exists a multiplicity of systems being similar in behavior within the monitoring target system. The information processing apparatus according to the Example increases the message quantity for analyzing the co-occurrence relation, i.e., learning target message logs by integrating the message logs given from the plurality of systems being similar in behavior. By the way, it is desirable for analyzing the co-occurrence relation with high accuracy by using the integrated message logs to employ the messages being close in way and state of the co-occurrence (which will hereinafter be referred to as a co-occurrence rules) among the plural message logs to be integrated. In other words, the plurality of systems common in a majority of co-occurrence rules has a high possibility to enable the information processing apparatus to analyze the co-occurrence relation with the high accuracy. Then, in the Example, the "behavior" connotes the message co-occurrence relation acquired as a result of, e.g., the analysis. It is also desirable that the "systems being similar in behavior" are understood as the systems having the similar message co-occurrence relation.

For example, when both of a system X and a system Y acquire a relation that "a message A and a message B appear by a predetermined rule, e.g., as a pair", the system A and the system Y may be processed as being similar in behavior. Deficiency of the message quantity, i.e., deficiency of a learning quantity, is obviated by integrating and analyzing the logs of the systems being similar in behavior. The users of the systems within the monitoring target system provide the message logs of the self-systems, and are thereby enabled to quickly obtain filters based on the co-occurrence relation applicable to the monitoring target system including other systems being similar in behavior to the self-systems.

Then, as illustrated in FIG. 3, the information processing apparatus, at first, analyzes the log co-occurrence relations by use of a small number of message logs, i.e., the message logs A, B, C, D, thus obtaining the co-occurrence relations thereof. The co-occurrence relation at this stage has a possibility that the accuracy is low. Next, the information processing apparatus integrates the monitoring target message logs that are similar in co-occurrence relation. It may be sufficient in a specific process to obtain the message co-occurrence relations by integrating the individual systems within the monitoring target system in place of integrating the message logs. The information processing apparatus repeats analyzing the log co-occurrences and integrating the message logs (or systems) at a plurality of stages.

Then, the information processing apparatus again analyzes the log co-occurrences of the message logs of the integrated systems, thus obtaining the individual co-occurrence relations. As a result of the process described above, a modulus of the target messages for analyzing the co-occurrence relations becomes larger than when the information processing apparatus performs the analysis on a system-by-system basis, and the information processing apparatus is thereby enabled to obtain the co-occurrence relations with the high accuracy.

In the Example, the co-occurrence relation is obtained not as a relation of each individual message but as a relation of every type of messages. For instance, messages mt1, mt2, mt3, . . . and other equivalent messages for reporting, e.g., a temperature of a certain specified temperature sensor T1, can be classified into one type of messages. Further, alarm messages mw1, mw2, mw3, . . . and other equivalent messages for reporting a certain event, e.g., abnormality of temperature, can be classified into one type of messages. It does not, however, mean that the Example has a limit to a way of classifying the messages according to the types. In other words, the processes by the information processing apparatus can be applied without depending on the way of classifying the messages according to the types, the way being adopted by the monitoring target system. Further, the information processing apparatus may calculate the co-occurrence relations about the individual messages for the monitoring target system with the messages not being classified according to the types.

FIG. 4 illustrates an instance of message patterns of the message logs of the system that calculates a degree of similarity. The message pattern can be said to be such a combination of types of the messages that a co-occurrence probability is equal to or larger then a threshold value. The message pattern, however, includes a combination of different types of messages and a repetition of the same type of messages. Further, a message pattern with the co-occurrence probability being equal to or larger than a predetermined value in the message logs of one system, is referred to also as an element, and a number of message patterns is also termed an element count.

A message log output from the system A contains message patterns [1,2,3], [1*] and [1,3] in an instance of FIG. 4. The message pattern [1,2,3] is such a message pattern that a message of type 1, a message of type 2 and a message of type 3 are repeated in the sequence of, e.g., the message type 1, the message type 2 and the message type 3. The message pattern [1,2,3] may be, however, defined such that the messages of the type 1, the type 2 and the type 3 are repeated by ignoring the sequence of the message types. A setting of whether the definition of the message pattern contains the sequence of the message types is not directly related to the processes of the information processing apparatus in the Example. The message pattern [1*] is a message group in which the message type 1 is repeated. The message pattern [1,3] is a message pattern in which the message type 1 and the message type 3 are repeated.

Further, in the system A of FIG. 4, in the message pattern [1,2,3], the message types 1, 2 and 3 are output at an occurrence interval of, e.g., (6±2) minutes, i.e., 4 through 8 minutes. Still further, in the message pattern [1*], the message type 1 is repeatedly output at the occurrence interval of, e.g., (2±1) minutes, i.e., 1 through 3 minutes. Yet further, in the message pattern [1,3], the message types 1 and 3 are output at the occurrence interval of, e.g., (4±2) minutes, i.e., 2 through 6 minutes.

On the other hand, in the instance of FIG. 4, the message log output from the system B contains the message patterns [1,2,3], [1*], [1,3] and [1,4]. Occurrence intervals of the message patterns [1,2,3], [1*], [1,3] and [1,4] are (7±2) minutes, (5±1) minutes, (4±1) minutes and (2±2) minutes.

The information processing apparatus in the Example calculates the degree of similarity between the systems according to the following definition. * The systems mutually obtain a distance between the message patterns. When different message patterns exist mutually in the systems, "1" is added to the distance. When a common message pattern exists mutually in the systems but when the occurrence interval of the common message pattern is not overlapped, "1" is added to the distance. Moreover, in the Example, the information processing apparatus deals with the systems with the message pattern being common and with the occurrence interval being overlapped even partially as the systems that mutually have the same co-occurrence relation. When the co-occurrence relation is the same, "1" is not added to the distances in the respective systems, but the distance is set to "0". It does not, however, mean that the Example is limited to the aforementioned definition of the distance.

Figure 5:
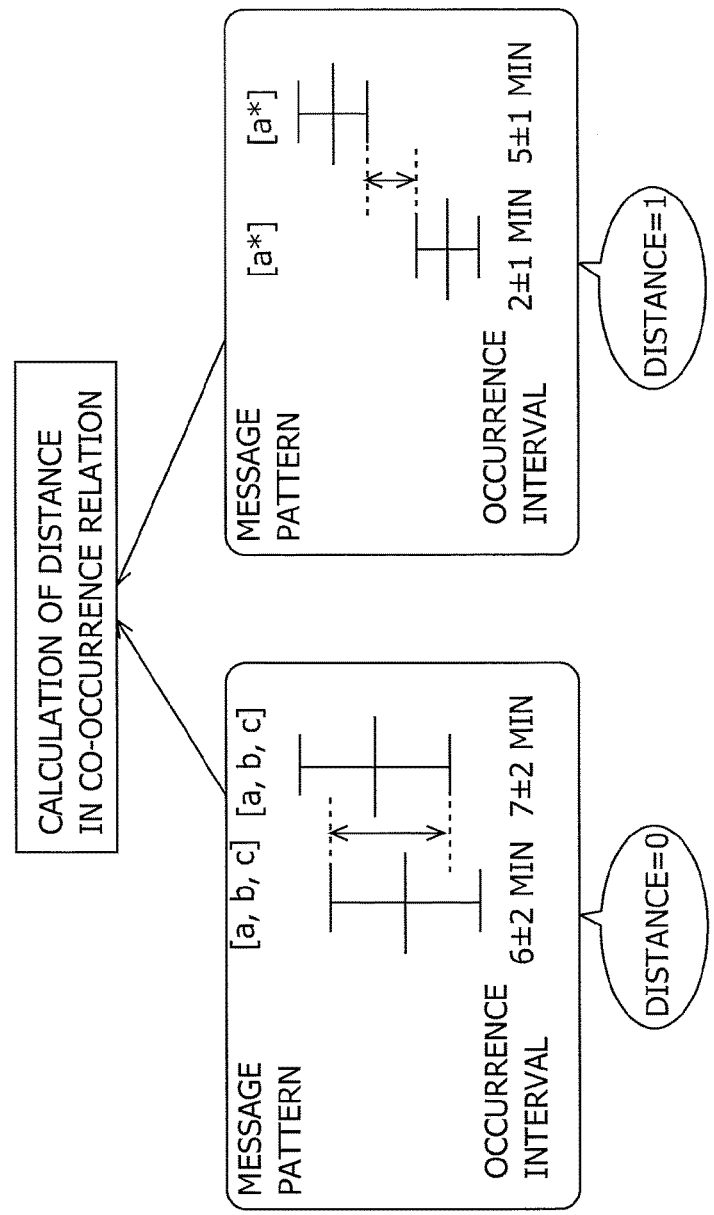
FIG. 5 is a diagram illustrating a distance between the systems.

FIG. 5 illustrates distances between the respective systems. On the left side in FIG. 5, a message pattern [a, b, c] having an occurrence interval of (6±2) minutes and a message pattern [a, b, c] having an occurrence interval of (7±2) minutes are common to each other in their message patterns and overlapped in their occurrence intervals. Accordingly, two sets of message groups on the left side in FIG. 5 have the same co-occurrence relation and a distance of "0". While on the right side, a message pattern [a*] having an occurrence interval of (2±1) minutes and a message pattern [a*] having an occurrence interval of (5±1) minutes are common to each other in their message patterns but are not overlapped in their occurrence intervals. Hence, two sets of message groups on the right side in FIG. 5 have the different co-occurrence relations and a distance of "1".

* Let "d" be a distance between the system A and the system B, n(A) be an element count of the system A and n(B) be an element count of the system B, a harmonic mean between $d/n(A)$ and $d/n(B)$ is defined in the following mathematical expression 1:

Harmonic Mean Between $d/n(A)$ And $d/n(B) = 2*(d/n(A))*(d/n(B))/(d/n(A)+d/n(B));$ [Mathematical Expression 1]

In the Example, the degree of similarity between the system A and the system B is defined by using the harmonic mean as given in the mathematical expression 1. In the mathematical expression 1, when $x=d/n(A)$ and $y=d/n(B)$, a result is given by the harmonic mean=$2*x*y/(x+y)$. The equation $x=d/n(A)$ represents a ratio of the distance between the system A and the system B to the element count n(A), and this ratio can be said to be a ratio of elements different from elements of the system B, which occupy the element count of the system A. Similarly, the equation $y=d/n(B)$ represents a ratio of the distance between the system A and the system B to the element count n(B), and this ratio can be said to be a ratio of elements different from elements of the system A, which occupy the element count of the system B.

A reason for using the harmonic mean as the degree of similarity is that the degree of similarity takes a value distanced from "0" when any one of distance ratios "x" and "y" takes a large value, resulting in non-similarity between the system A and the system B. Herein, let "=:" be a sign indicating a value to be approximated, the degree of similarity=: 2y when x>>y; the degree of similarity=:y when x=y; the degree of similarity=1 when the element counts are the same but all elements are not of coincidence and when x=y=1; x=:1, y=1001 and the degree of similarity=: 2 when the element count n(A)=1000, the element count n(B)=1 and all elements are not of coincidence; and x=y=0 and the degree of similarity takes a variable value when the element counts are the same but all elements are coincident.

Then, the information processing apparatus involves using the following definition to attain a range of the degree of similarity that takes a value equal to or larger than "1" but a tenfold value of the mathematical expression 1.

Degree of Similarity Between System A And System $B=20*(d/n(A))*(d/n(B))/(d/n(A)+d/n(B))+1;$
(when other than $d=0$) [Mathematical Expression 2]

where the degree of similarity between the system A and the system B is given by Degree of Similarity=1; (when d=0).

According to the definition of the mathematical expression 2, the degree of similarity between the system A and the system B in FIG. 4 is given as follows. The elements of the message pattern [1, 2, 3] have an overlapped portion when the occurrence intervals are (6±2) minutes and (7±2) minutes, and hence the co-occurrence relation is common, but the distance is "0". The elements of the message pattern [1*] have no overlapped portion when the occurrence intervals are (2±1) minutes and (5±2) minutes, and hence the co-occurrence relation is not common, but the distance is "1". The elements of the message pattern [1, 3] have an overlapped portion when the occurrence intervals are (4±2) minutes and (4±1) minutes, and therefore the co-occurrence relation is common, but the distance is "0". The elements of the message pattern [1, 4] of the system B do not exist in the system A. Accordingly, the elements are not of coincidence, the co-occurrence relation is not common, and the distance is "1".

From what has been discussed above, the distance d between the system A and the system B is given by d=2. Further, the element count n(A) of the message logs of the system A is given by n(A)=3, and the element count n(B) of the message logs of the system B is given by n(B)=4. Therefore, according to the mathematical expression 2, the following equation is established;

Degree Of Similarity $S(A,B)=20*(2/3)*(2/4)/(2/3+2/4)+1=47/7$

The information processing apparatus obtains the degree of similarity between systems within the monitoring target system according to the definitions in FIGS. 4 and 5 with respect to the message logs acquired from the plurality of systems within the monitoring target system. Then, the information processing apparatus performs clustering the systems by integrating the plurality of systems in which the value of the degree of similarity acquired between the systems falls within a predetermined range.

Figure 6:
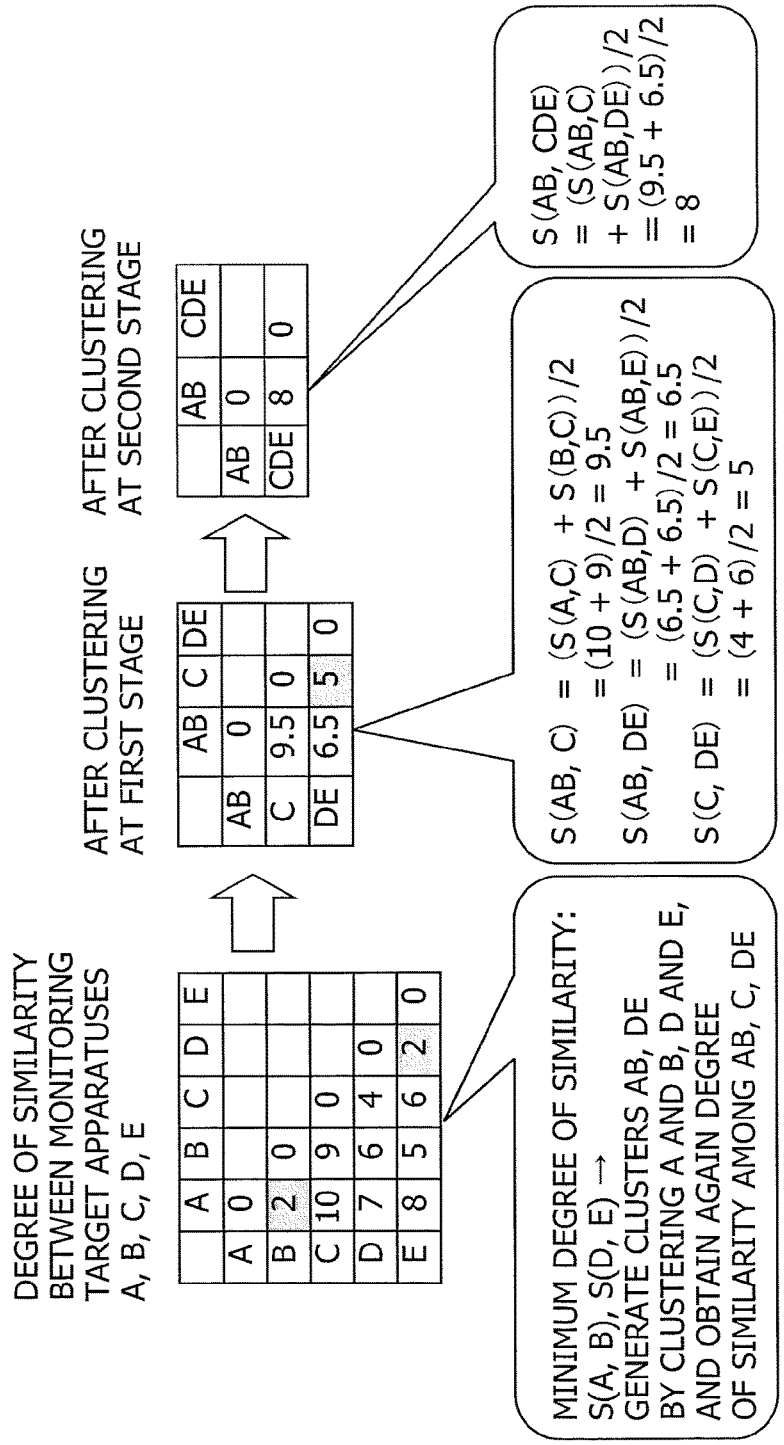
FIG. 6 is a diagram illustrating an example of clustering the systems based on a degree of similarity between the message logs.

FIG. 6 illustrates the system clustering based on the degree of similarity of the message logs. In FIG. 6, the message logs are clustered based on the degree of similarity of the message logs of the systems A, B, C, D and E. The clustering connotes analyzing the co-occurrence relations of the messages by handling the plurality of systems within the monitoring target system as one cluster. The information processing apparatus performs clustering the systems together having the message logs containing the elements with the degree of similarity being small in value, i.e., with the message patterns being coincident and the occurrence intervals being large in overlap.

In FIG. 6, the degree of similarity between the system A and the system B is S(A,B)=2. Further, the degree of similarity between the system D and the system E is S(D, E)=2. Then, the information processing apparatus performs clustering, at first, the system A and the system B, and clustering the system D and system E. A cluster of the system A and the system B is notated by AB. Further, a cluster of the system D and the system E is notated by DE.

In FIG. 6, after clustering at a first stage, the system clusters are AB, C and DE. The cluster C is, however, a single system C itself. The information processing apparatus obtains the degree of similarity between the clusters after clustering at the first stage. The degree of similarity between the clusters entails adopting an average value between the systems before clustering at the first stage, an average value between the clusters, and an average value between the cluster and the system.

For instance, a degree of similarity S(AB,C) between the cluster AB and the system C is given as follows:

$$S(AB,C)=(S(A,C)+S(B,C))/2=(10+9)/2=9.5$$ [Mathematical Expression 3]

Further, a degree of similarity S(AB,DE) between the cluster AB and the cluster DE is given as follows:

$$S(AB,DE)=(S(AB,D)+S(AB,E))/2=(6.5+6.5)/2=6.5$$ [Mathematical Expression 4]

where a degree of similarity S(AB,D) and a degree of similarity S(AB,E) are given by S(AB,D)=(6+7)/2=6.5; and S(AB,E)=(8+5)/2=6.5. Moreover, a degree of similarity S(C,DE) between the system C and the cluster DE is given by:

$$S(C,DE)=(S(C,D)+S(C,E))/2=(4+6)/2=5.$$ [Mathematical Expression 5]

Further, the minimum value of the degree of similarity between the clusters after clustering at the first stage is the degree of similarity S(C,DE)=5 between the system C and the cluster DE, and hence the system C and the cluster DE are clustered to be CDE at a second stage. After clustering at the second stage, a degree of similarity S(AB,CDE) between the cluster AB and the cluster CDE is given as below:

$$S(AB,CDE)=(S(AB,C)+S(AB,DE))/2=(9.5+6.5)/2=8$$ [Mathematical Expression 6]

Figure 7:
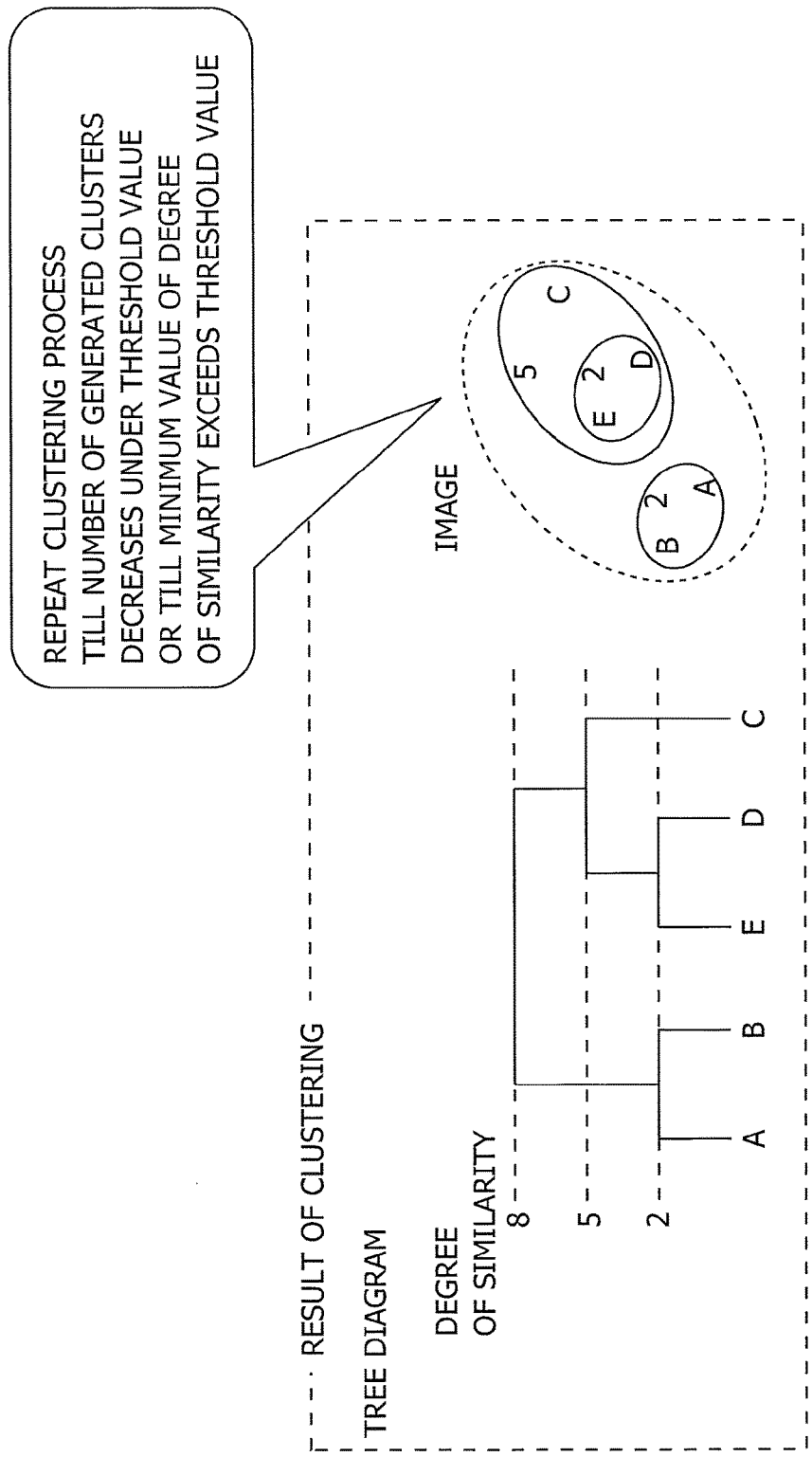
FIG. 7 is a diagram depicting an image of a clustering result.

FIG. 7 illustrates an image of a clustering result in FIG. 6. In FIG. 6, the clusters AB and DE are generated when clustering at the first stage, and the cluster CDE is generates when clustering at the second stage. The information processing apparatus performs clustering to a predetermined limit in the sequence of the smallest value of the degree of similarity between the single systems, between the clusters and between the single system and the single cluster. In the Example, the information processing apparatus iterates the clustering process till the number of clusters to be generated decreases under a threshold value or till the minimum value of the degree of similarity based on the definition given in the mathematical expression 2 exceeds the threshold value. In the instance of FIG. 6, the information processing apparatus sequentially generates the clusters AB, DE and CDE within the range of the degree of similarity of "5". The process in FIG. 6 can be described in a tournament combination diagram, in which the axis of abscissa indicates the system, while the axis of ordinates indicates the degree of similarity. Further, the process in FIG. 6 can be described in an image diagram, in which, e.g., the clusters are expressed by eclipses each containing a couple of systems included in the clusters, and the degree of similarity between the systems.

Figure 8:
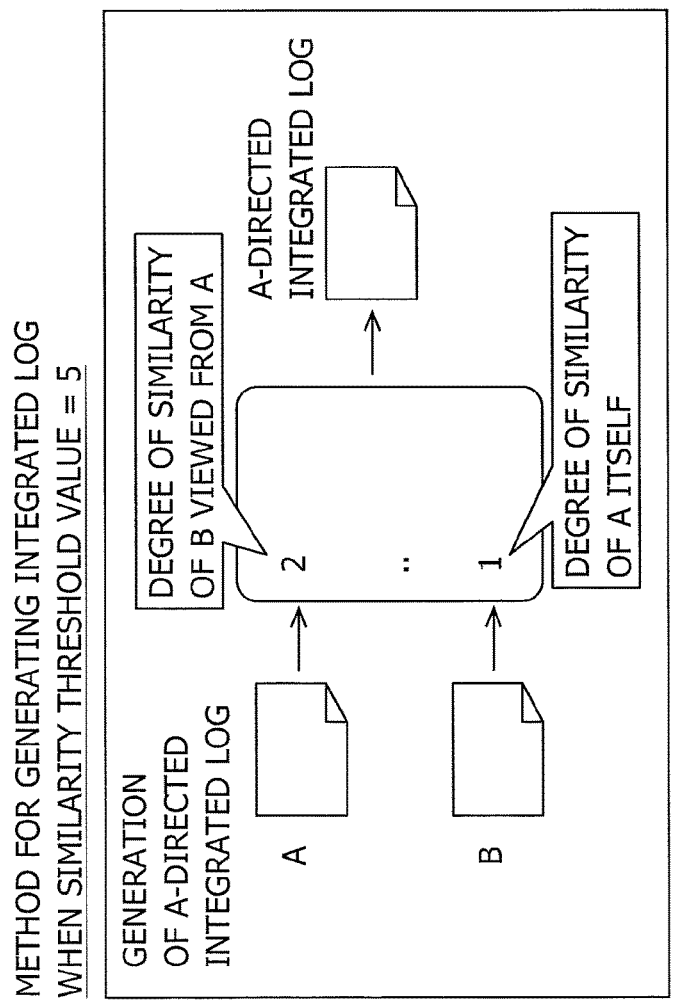
FIG. 8 is a diagram illustrating a procedure of mixing the message logs.
Figure 9:
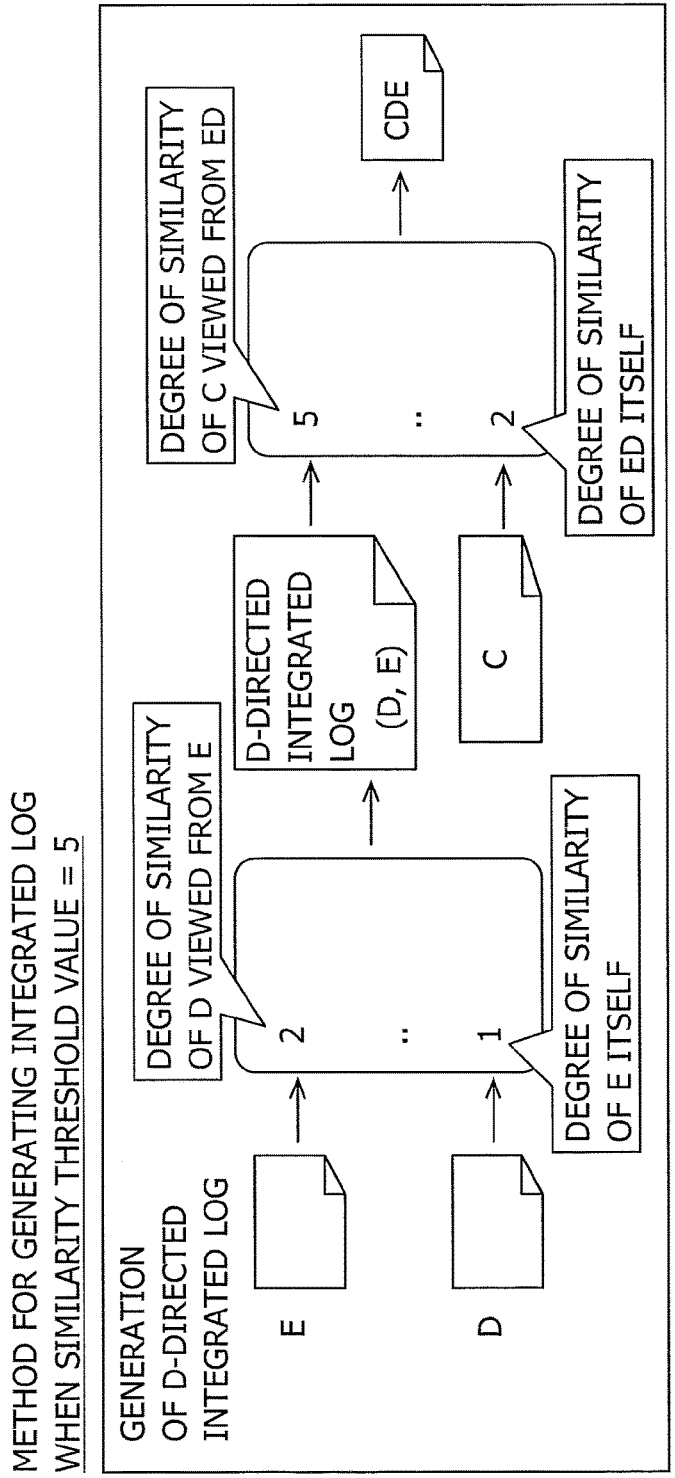
FIG. 9 is a diagram illustrating the procedure of mixing the message logs.

Next, the information processing apparatus mixes the message logs corresponding to the clustering result. FIGS. 8 and 9 are diagrams illustrating a procedure of mixing the message logs. The information processing apparatus mixes the two message logs corresponding to the degree of similarity when mixing the message logs of the system A and the message logs of the system B. As in FIG. 8, the degree of similarity between the message logs of the system A itself is "1", while the degree of similarity between the message logs of the system A and the system B is "2", in which case the information processing apparatus mixes the message logs of the system A and the system B at a ratio of 2:1 in the integrated logs to be mixed for the system A. In other words, a density of the mixing target message logs is lessened corresponding to the degree of similarity between the self-system and a peer system (or a peer cluster), thus generating the integrated logs for the self-system. Inversely, as the degree of similarity between the message logs of the system A and the system B takes a smaller value, i.e., as the system A and the system B have more similarity to each other, the message logs are mixed by increasing the message log ratio of the system B in the integrated logs to be mixed for the system A. Incidentally it will be apparent that the degree of similarity between the single systems themselves is given by "Degree of Similarity=1" when applying the mathematical expression 1 with respect to the message logs of the system A and the message logs of the same system A.

FIG. 9 illustrates a processing instance of mixing D-directed integrated logs generated from the systems D, E with message logs of a system C, thereby generating D-directed integrated logs. In this instance, the information processing apparatus generates the integrated logs directed to the system E by mixing the message logs of the system D and the message logs of the system E together at a ratio of 2:1 between the degree of similarity "1" of the message logs of the system E itself and degree of similarity "2" between the system D and the system E.

Next, it is assumed that the degree of similarity of the D-directed integrated logs (DE) generated from the systems D, E is "2", while the degree of similarity between the integrated logs (DE) and the message logs of the system E is "5". In this case, the information processing apparatus mixes the integrated logs (DE) with the message logs of the system C at a ratio of 5:2, thereby generating the integrated logs (CDE) directed to the system D.

It is thus feasible to reduce a side effect caused by mixing the message logs of the peer system (peer cluster) with the low similarity between the message pattern and the occurrence interval by varying the mixing ratio of the message logs in accordance with the degree of similarity of the message logs of the self-system (self-cluster) and the degree of similarity of the message logs of the mixing target peer system as viewed from the self-system (self-cluster).

Figure 10:
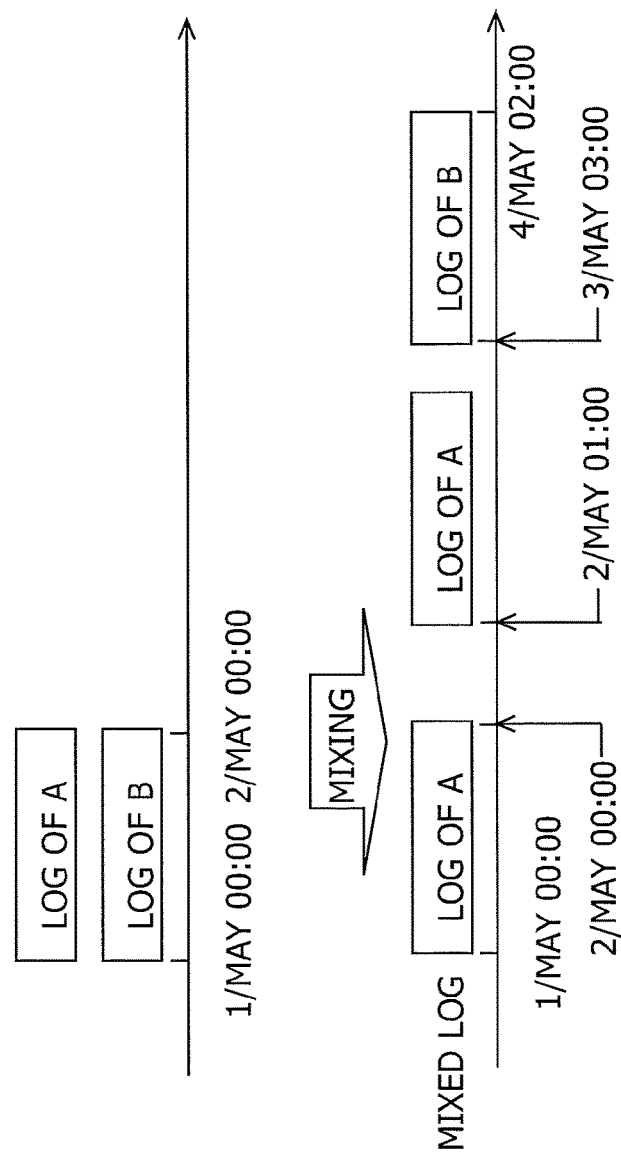
FIG. 10 is a diagram illustrating a method of mixing the message logs.

FIG. 10 illustrates a mixing method of the message logs. The information processing apparatus in the Example adopts the following rules when mixing the plurality of message logs.

(Rule 1) Mixing by shifting the time while retaining an event occurrence sequence within the log.
(Rule 2) Mixing at a sufficient interval not to cause the co-occurrence in the events within the two logs.

FIG. 10 depicts an instance of mixing the message log of the system A with the message log of the system B at the ratio of 2:1. Both of the message logs are timestamped at 5/1 00:00 through 5/2 00:00. In this instance, the information processing apparatus allocates periods of time to the message logs by timestamping the message log of the system A at 5/1 00:00 through 5/2 00:00, the message log of the system A at 5/2 01:00 through 5/3 01:00, and the message log of the system B at 5/3 02:00 through 5/4 02:00, and mixes these message logs. This mixing enables the information processing apparatus to restrain the occurrence of the co-occurrence relation not actually existing due to the mixing.

<Instance of System>

Figure 11:
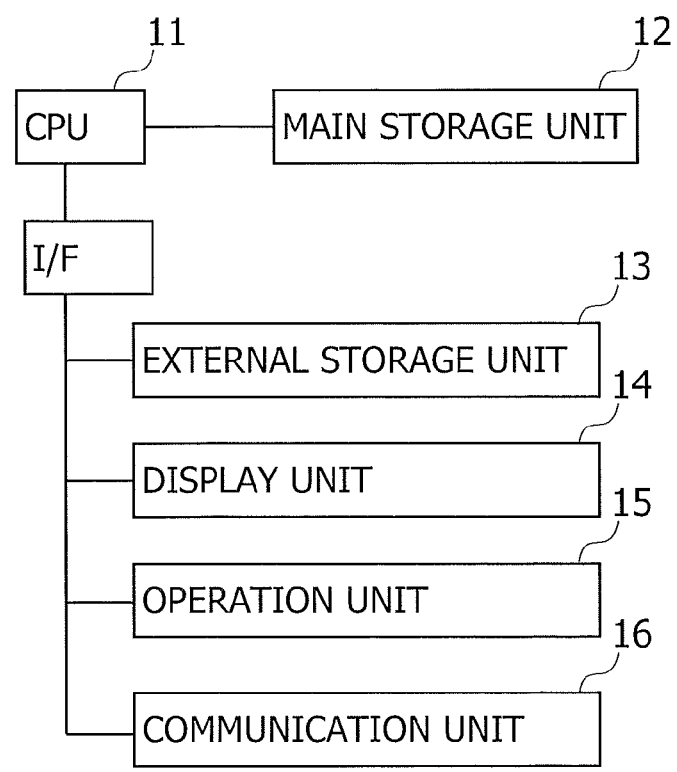
FIG. 11 is a diagram depicting a hardware configuration of the information processing apparatus.

FIG. 11 is a diagram illustrating a hardware configuration of the information processing apparatus according to an embodiment. Note that each of the systems within the monitoring target system has the same configuration as in FIG. 11. The information processing apparatus includes a CPU 11, a main storage unit 12 and external devices connected to the CPU 11 via an interface (I/F), and executes information processing based on a program. The CPU 11 is one instance of a processor. The main storage unit 12 is one instance of a main storage unit. The external devices may be exemplified by an external storage unit 13, a display unit 14, an operation unit 15 and a communication unit 16.

The CPU 11 executes a computer program deployed in an executable manner on the main storage unit 12, thereby providing functions of an information processing apparatus 10. The main storage unit 12 stores the computer program to be executed by the CPU 11, data to be processed by the CPU 11, and other equivalent software components. The main storage unit 12 is exemplified by a Dynamic Random Access Memory (DRAM), a Static Random Access Memory (SRAM), a Read Only Memory (ROM) and other equivalent memories. The external storage unit 13 is used as a storage area for assisting, e.g., the main storage unit 12, and stores the computer program to be executed by the CPU 11, the data to be processed by the CPU 11, and other equivalent software components. The external storage unit 13 is exemplified by a Hard Disk Drive (HDD), a Solid State Disk (SSD) and other equivalent drives. The information processing apparatus 10 may be provided with a drive for a non-transitory removable storage medium. The removable storage medium is exemplified by a Blu-ray disc, a Digital Versatile Disk (DVD), a Compact Disc (CD), a flash memory card, and other equivalent mediums.

The information processing apparatus includes the display unit 14, the operation unit 15 and the communication unit 16. The display unit 14 is exemplified by a liquid crystal display, an electroluminescence panel, and other equivalent displays. The operation unit 15 is exemplified by a keyboard, a pointing device and other equivalent devices. In the embodiment, the pointing device is exemplified by a mouse. The communication unit 16 transmits and receives the data to and from other devices on a network. For instance, the CPU 11 acquires the message logs from the monitoring target system via the communication unit 16.

Figure 12:
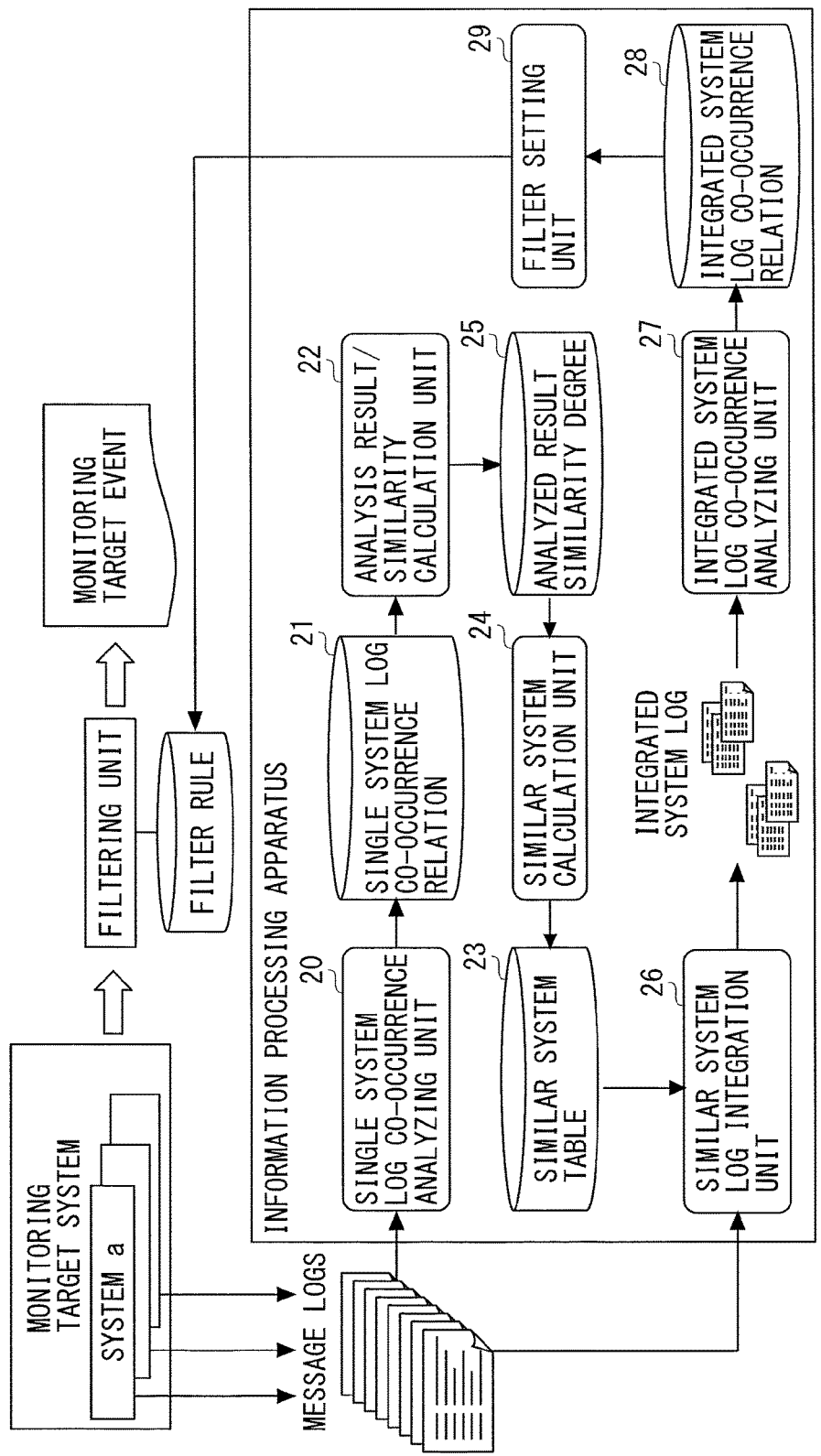
FIG. 12 is a diagram illustrating relations between respective processing units of the information processing apparatus and data to be processed by these processing units.

FIG. 12 is a diagram illustrating relations between respective processing units of the information processing apparatus and data to be processed by these processing units. As in FIG. 12, the information processing apparatus analyzes the message logs as records of accumulated messages issued from the plurality of systems within the monitoring target system, and generates the filter rules based on the co-occurrence relation between the messages.

Herein, the monitoring target system is an information system managed by the information processing apparatus, but it does not mean that there is a limit to the monitoring target system itself. For instance, the monitoring target system includes a monitoring target computer and a plurality of other systems. In the Example, the message log is generated per system within the monitoring target system. However, one system may generate a plurality of message logs.

As in FIG. 12, the information processing apparatus includes respective processing units, i.e., a single system log co-occurrence analyzing unit 20, an analysis result/similarity calculation unit 22, a similar system calculation unit 24, a similar system log integration unit 26, an integrated system log co-occurrence analyzing unit 27, and a filter setting unit 29. The CPU 11 of the information processing apparatus performs as the respective processing units by executing the computer program deployed in the executable manner on the main storage unit 12. However, at least a part of any of the processing units of the information processing apparatus 1 illustrated in FIG. 12 may be configured by a hardware circuit.

The single system log co-occurrence analyzing unit 20 analyzes the message logs as the records of the accumulated messages issued from the plurality of systems within the monitoring target system, and thus outputs a single system log co-occurrence relation 21. The single system log co-occurrence relation 21 is a group of such a type of messages that the co-occurrence probability between the message types is equal to or larger than a predetermined value, these messages being collected from the messages issued from the individual systems within the monitoring target system. The group of such a type of collected messages that the co-occurrence probability between the message types is equal to or larger than the predetermined value, is also called the message pattern. In the instance, however, in addition to the group of the message type (message pattern), the single system log co-occurrence relation 21 includes an intra-pattern message distribution time width defined as a time characteristic till message type of the message pattern occurs. The single system log co-occurrence analyzing unit 20 is one instance of an analyzing unit.

The analysis result/similarity calculation unit 22 compares the co-occurrence relations between the systems within the monitoring target system, and thus outputs an analysis result similarity 25. The analysis result similarity 25 stores the degrees of similarity between the systems within the monitoring target system. The analysis result similarity 25 is also one instance of an analyzing unit.

The similar system calculation unit 24, executes, based on the analysis result similarity 25, the clustering process, and generates and outputs a clustered system to a similar system table 23. Further, the similar system calculation unit 24 repeats the clustering process for the systems undergoing the execution of the clustering process within the monitoring target system. To be specific, the similar system calculation unit 24 calculates the degrees of similarity between the single systems, between the clustered systems and between the single system and the clustered system. Then, the similar system calculation unit 24 repeats the clustering process till the value of the degree of similarity exceeds the predetermined value or till the number of systems within the monitoring target system including the clustered systems is equal to or smaller than the predetermined value. The similar system calculation unit 24 is one instance of an integration unit.

With respect to the clustered systems, the similar system log integration unit 26 integrates the message logs of the pre-clustering systems, thus generating the integrated system log. The integrated system log co-occurrence analyzing unit 27 analyzes the integrated system log, and outputs an integrated system log co-occurrence relation 28. The integrated system log co-occurrence analyzing unit 27 processes the integrated system log as a processing target, and, however, processing contents are the same as those of the single system log co-occurrence analyzing unit 20. The processing of the single system log co-occurrence analyzing unit 20 and the processing of the integrated system log co-occurrence analyzing unit 27 can be aggregated into common processing termed, e.g., a log co-occurrence analyzing unit.

The filter setting unit 29 generates a filter rule, based on the integrated system log co-occurrence relation 28. The filter rule is such a rule as to select one of the message types contained in the message pattern with the co-occurrence probability being equal to or larger than the predetermined value. For instance, the filter rule is the rule of selecting a message type a from the message pattern [a, b, c]. The filter setting unit 29 applies the filter to the message of the monitoring target system according to the filter rule, and outputs a monitoring target event. The filter setting unit 29 is one instance of a setting unit.

<Data Structure and Data Instance>

FIG. 13 illustrates a message log management register. The message log management register registers a relation between a message log file name and system specifying information. A message log file name is a file name in a storage location of the message issued from the monitoring target system. System specifying information is information for specifying the system outputting the message to a file having the message log file name. The system specifying information is exemplified by a host name on the network receiving a connection of the system, a network address of the system, and other equivalent information. As in FIG. 13, a plurality of message log files possibly exists for one system, e.g., the system sys001.

FIG. 14 illustrates a structure and items of data of the message log. In the Example, the message log is specified by the message log file name. In a table of FIG. 14, a first row is a comment row (title row) for descriptions of fields. In the table of FIG. 14, the rows from the second row onward correspond to records each containing a message. Each record of the message log has an "ID" field, a "time" field, a "message type" field, and a "message" field.

The ID is identifying information allocated to each message and is, e.g., a serial number in the message logs throughout. The ID may be, however, the identifying information being unique in the entire monitoring target system. The time is time information being timestamped when the message is issued. In the instance of FIG. 14, the time contains year/month/day information (e.g., 2012-03-13), time information (T10:31:02) and Greenwich Mean Time (GMT) (09:00). GMT 09:00 indicates a 9-hour deviation, i.e., Japanese standard time. The message type is information for specifying a type of message. The message type specifies, e.g., a type of the monitoring target information instanced by identifying information of a sensor, identifying information of a resource, e.g., a memory, assortment of an alarm, and other equivalent information. In the Example, the message patterns [1,2,3], [1*] and other equivalent patterns have not the co-occurrence relations between the individual messages but the co-occurrence relations between the types of messages. FIG. 14 depicts instances of the individual messages issued from the respective systems.

FIG. 15 is a diagram illustrating data of the single system log co-occurrence relation 21. The single system log co-occurrence relation 21 stores an occurrence status of the message pattern per single system, and specifically, e.g., the co-occurrence probability stores a predetermined or larger number of message groups. FIG. 15 illustrates a data instance of the system sys002. In the instance of FIG. 15, the first row is the comment row (title row) for the descriptions of the fields. In the table of FIG. 15, the rows from the second row onward correspond to records each containing items of data of the co-occurrence relation.

As in FIG. 15, each of the records of the single system log co-occurrence relation 21 has a "co-occurrence message pattern" field, a "pattern occurrence count" field, and an "intra-pattern message distribution time width (min)" field. The co-occurrence message pattern represents a message type of the message group with the co-occurrence probability being equal to or larger than the predetermined value. For instance, the co-occurrence message pattern [1, 2, 3] indicates a message group of the message types 1, 2, 3. Further, the co-occurrence message pattern [1*] indicates a message group of the repeated message type 1.

The pattern occurrence count is a number of times the message having the intra-system message pattern is issued in a message log acquisition period. The intra-pattern message distribution time width (min) is a length of time till obtaining a complete set of messages of the message pattern. In the instance of the message pattern [1, 2, 3], the distribution time width (min) is a length of time till the messages of the types 2 and 3 occur after the occurrence of the message of the type 1. Further, in the instance of the message pattern [1*], the distribution time width (min) is a length of time till the message of the type 1 occurs next after the occurrence of the message of the type 1.

FIG. 16 illustrates items of data of the integrated system log co-occurrence relation 28. The integrated system log co-occurrence relation 28 contains items of data specifying the message groups with the co-occurrence probability being equal to or larger than the predetermined value in the message logs integrated as being directed to the respective systems with respect to the group of the plurality of clustered systems. The integrated message log is to be called an integrated system log. The integrated system log co-occurrence relation 28 has the same data structure as the data structure of the single system log co-occurrence relation 21 in FIG. 15, and therefore its description is omitted.

FIG. 17 depict an instance of data of the analysis result similarity 25. The analysis result similarity 25 contains results of calculating the similarities between the systems within the monitoring target system, the calculated results being described in a table format. In the data instance of FIG. 17, the system names are listed both in a row-direction and in a column direction of the table, in which the degrees of similarity between the systems in the row positions and the systems in the column positions are recorded in entries arranged in matrix.

FIG. 18 illustrates the similar system table 23. The similar system table 23 is a relational table between the clusters and the systems included in the clusters. In the table of FIG. 18, the first row is a comment row (title row) for descriptions of fields. The respective rows from the second row onward correspond to records of the similar system table 23. Each of the records of the similar system table 23 contains a cluster ID, a degree of similarity and a similar system. The cluster ID is information for identifying each cluster. The degree of similarity is a degree of similarity between the clusters. The similar system is information for identifying the system included in the cluster.

Figure 19:
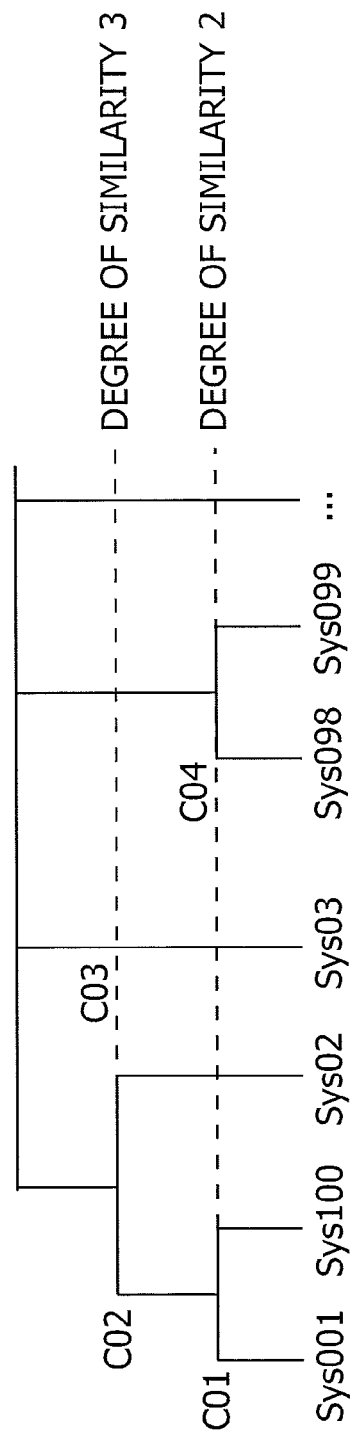
FIG. 19 is a diagram illustrating the similar system table in a tournament model.

FIG. 19 illustrates an instance of the similar system table of FIG. 18 in a tournament model. In the instances of FIGS. 18 and 19, e.g., both of clusters C01 and C04 have the degree of similarity of "2". The cluster C01 includes the systems sys001 and sys100. The cluster C04 includes the systems sys098 and sys099. The cluster C02 has the degree of similarity of "3", and includes the cluster C01 and the system sys002. Note that FIGS. 18 and 19 in the Example illustrate instances delimited at the degree of similarity="3". On the other hand, the degree of similarity between the cluster C03 and other systems or clusters is larger than "3" and is therefore not calculated. In the instances of FIGS. 18 and 19, the cluster C03 includes the system sys003.

<Processing Flow>

Figure 20:
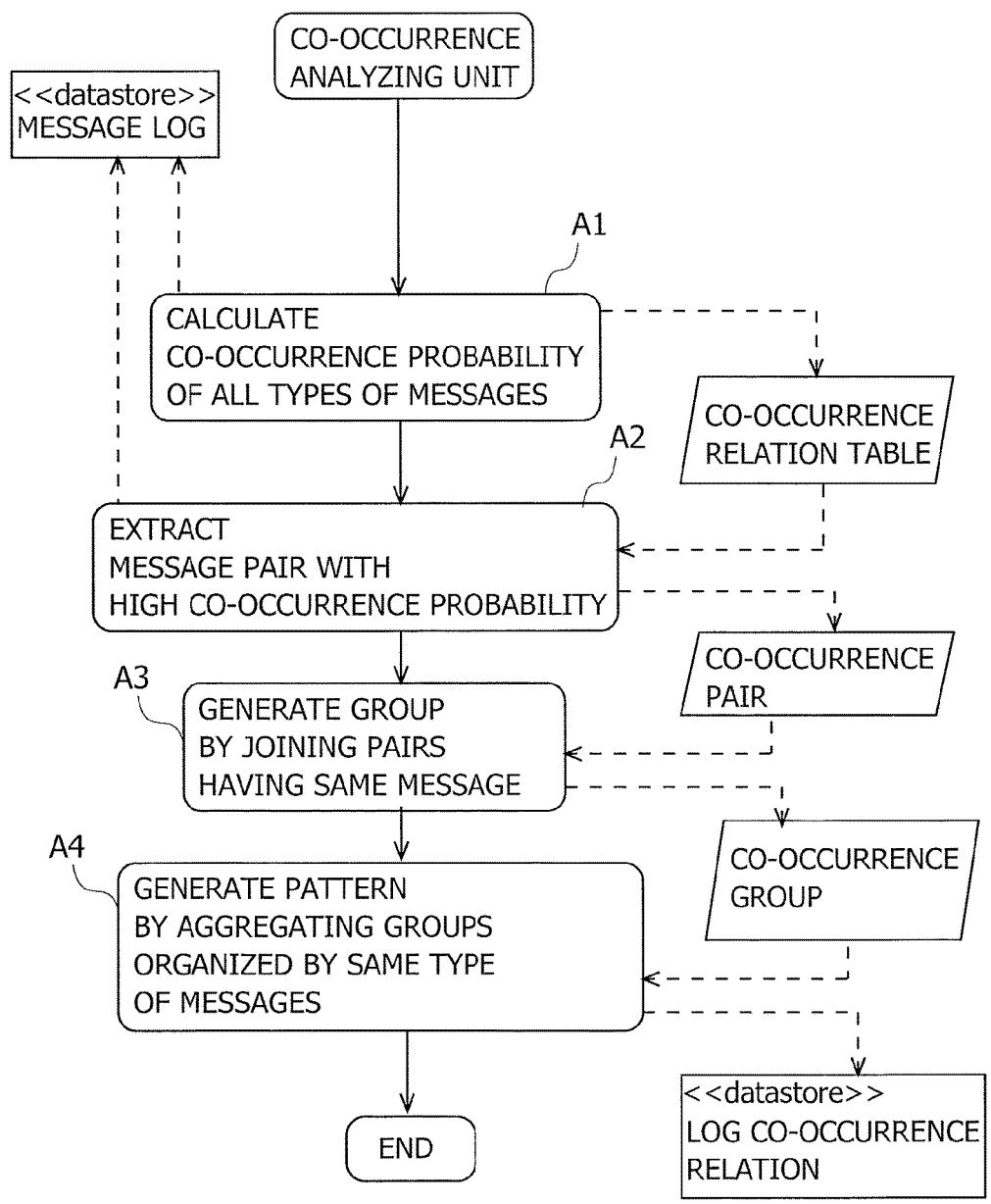
FIG. 20 is a flowchart illustrating processes of a co-occurrence analyzing unit.

FIG. 20 is a flowchart illustrating processes of the co-occurrence analyzing unit. The co-occurrence analyzing unit is a processing unit that is implemented in the single system log co-occurrence analyzing unit 20 and the integrated system log co-occurrence analyzing unit 27 depicted in FIG. 12. Herein, the single system log co-occurrence analyzing unit 20 and the integrated system log co-occurrence analyzing unit 27 are generically termed the co-occurrence analyzing unit, and the processes in FIG. 20 will be described.

The co-occurrence analyzing unit calculates the co-occurrence probability about all types of messages of the processing target message logs (A1). Herein, the processing target message log is the message log of the single system with respect to the single system log co-occurrence analyzing unit 20. The processing target message log is also the integrated system log undergoing the clustering with respect to the integrated system log co-occurrence analyzing unit 27. The co-occurrence analyzing unit retains the calculated co-occurrence probability in the co-occurrence relation table of the main storage unit 12. The co-occurrence relation table is herein a table configured to set the co-occurrence probability for, e.g., a message type pair in the processing target message log. Next, the co-occurrence analyzing unit extracts, from the message log, a message pair with the co-occurrence probability being higher than the predetermined value according to the co-occurrence relation table containing the calculation results of the co-occurrence probability in A1 (A2). In the process of A2, the co-occurrence analyzing unit extracts the individual message pair corresponding to the type pair exhibiting the high co-occurrence probability in the message type pairs generated in A1. The co-occurrence analyzing unit retains the extracted message pair as a co-occurrence pair on the main storage unit 12. Next, the co-occurrence analyzing unit generates a co-occurrence group by joining the message pairs each having the same message (A3). The co-occurrence analyzing unit retains the generated co-occurrence group on the main storage unit 12. Subsequently, the co-occurrence analyzing unit generates the message pattern by aggregating the same type of message groups (A4). In the process of A4, the co-occurrence analyzing unit generates the message pattern exhibiting a relation between the message types from the co-occurrence group having the individual messages. In the process of A1, the information processing apparatus obtains the co-occurrence probability between the two message types, and determines the co-occurrence probability per message type as a premise for generating the message pair. On the other hand, In A2 and A3, the information processing apparatus analyzes the relation between the individual message pairs for obtaining the message group. The message group can be analyzed with high accuracy through these processes. Then, in A4, the information processing apparatus generates the message pattern by extracting the relation between the message types from the obtained message group.

The co-occurrence analyzing unit retains the generated message pattern in the log co-occurrence relation table of the main storage unit 12. The co-occurrence relation table is the single system log co-occurrence relation 21 with respect to the single system log co-occurrence analyzing unit 20, and is the integrated system log co-occurrence relation 28 in FIG. 16 with respect to the integrated system log co-occurrence analyzing unit 27. The processes in A1 through A4 of FIG. 20 are one instance of extracting a co-occurrence message group per system, based on a co-occurrence probability, from a plurality of logs as records of accumulated messages generated within the systems.

Figure 21:
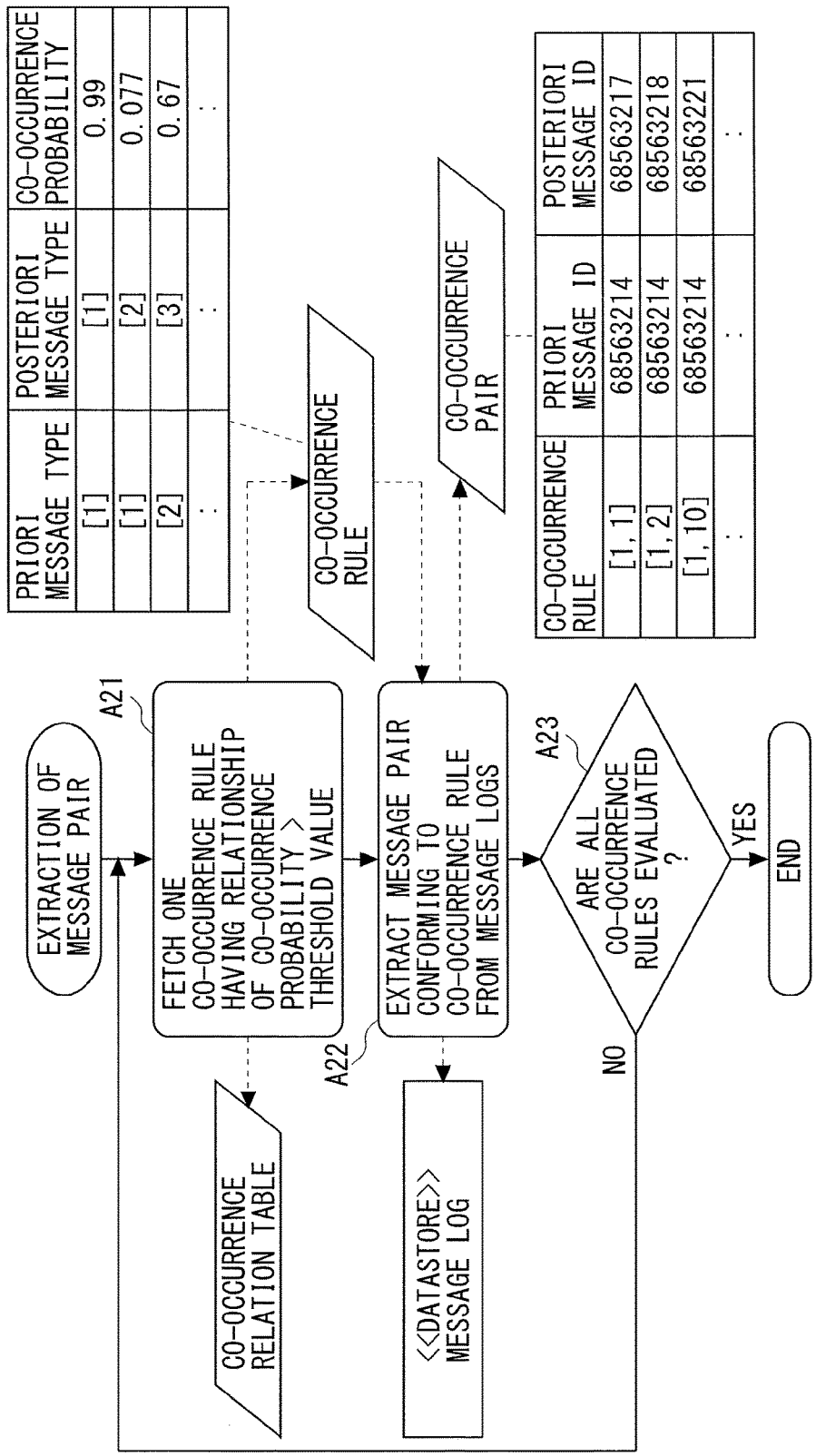
FIG. 21 is a flowchart illustrating in detail a message pair extraction process.

FIG. 21 is a flowchart illustrating details of the message pair extraction process (A2 in FIG. 20). Before starting the processes in FIG. 21, the co-occurrence relation table of the main storage unit 12 retains the co-occurrence probability per type pair of the messages in the processing target message logs in the process of A1 in FIG. 20. Each of records of the co-occurrence relation table contains, e.g., a priori message type, a posteriori message type and a co-occurrence probability.

The information processing apparatus in this process fetches one record with the co-occurrence probability being larger than the threshold value from the co-occurrence relation table (A21). Note that one record of the co-occurrence relation table is called a co-occurrence rule. The process in S21 is one instance of extracting a combination of message types having a co-occurrence probability being equal to or larger than a predetermined value between the message types into which the messages are categorized. The co-occurrence rule will hereinafter be expressed by a pair of the priori message type and the posteriori message type. For instance, the co-occurrence rule is described by [1,1], [1,2] and other equivalent notations.

Next, the information processing apparatus extracts the message pair (priori message ID, posteriori message ID) conforming to the co-occurrence rule fetched from the message log in A21 (A22). The information processing apparatus retains the extracted message pair on the main storage unit 12 by being associated with the co-occurrence rule. The co-occurrence pair retained on the main storage unit 12 contains, as in FIG. 21, the co-occurrence rule, the priori message ID and the posteriori message ID. The information processing apparatus then determines whether all of the co-occurrence rules are evaluated or not (A23). The information processing apparatus, when all of the co-occurrence rules are not yet evaluated, further executes the process in A21. Whereas when all of the co-occurrence rules are evaluated, the information processing apparatus finishes the message pair extraction process.

Figure 22:
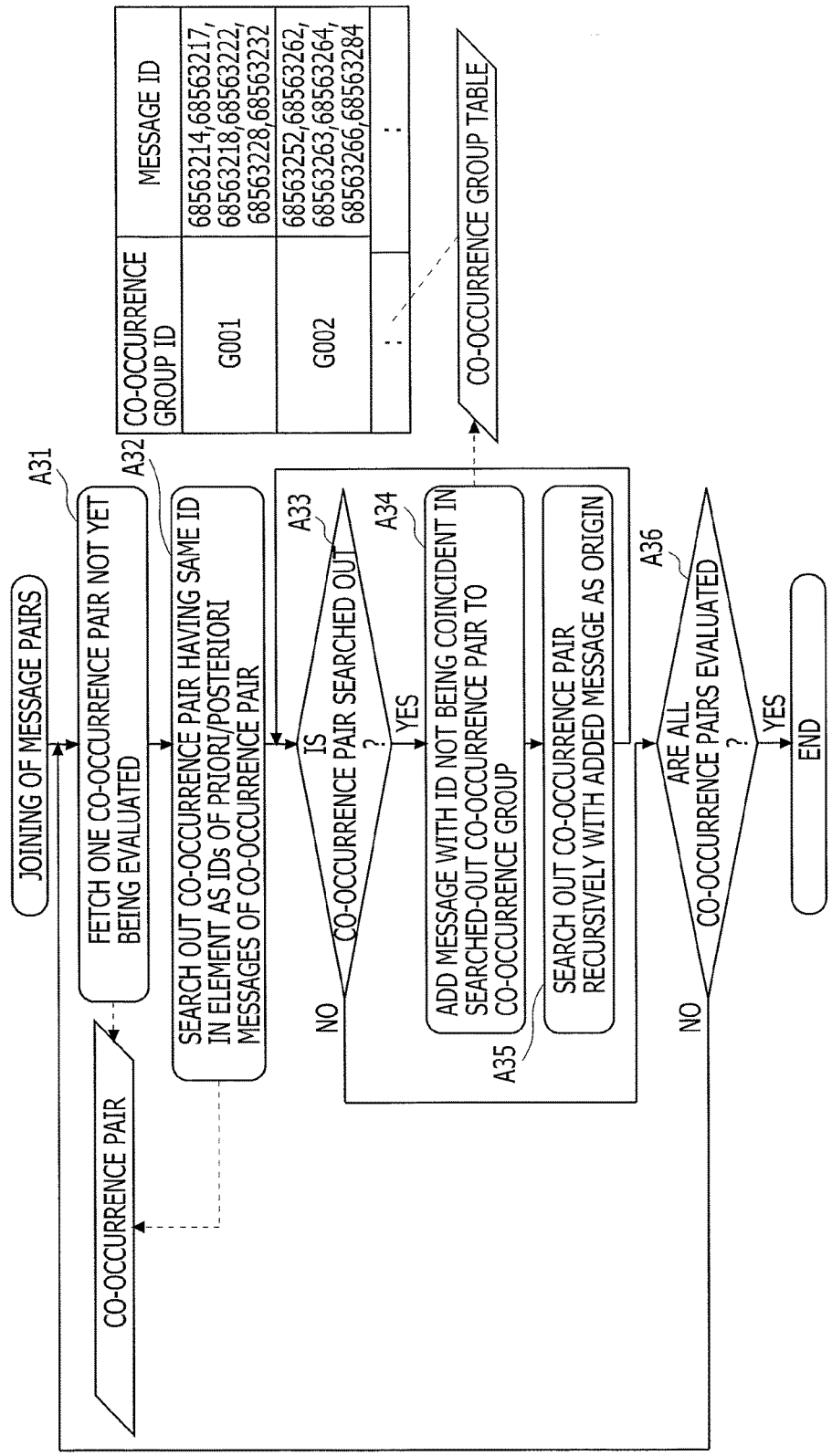
FIG. 22 is a flowchart illustrating in detail a message pair joining process.

FIG. 22 is a flowchart illustrating details of the message pair joining process (A3 in FIG. 20). Processes in FIG. 22 are processes of generating the message group from the plurality of message pairs generated in FIG. 21. In these processes, the co-occurrence analyzing unit fetches one co-occurrence pair (also termed a parget pair) that this not yet evaluated (A31). The co-occurrence analyzing unit searches out another co-occurrence pair having the same message ID as the message ID of the priori message or the posteriori message of the target pair (A32). Subsequently, the co-occurrence analyzing unit determines whether or not another co-occurrence pair is searched out (A33). When another co-occurrence pair is searched out, the co-occurrence analyzing unit generates a co-occurrence group by combining the target pair with the message, having the message ID not coincident with the ID of any one message of the target pair being processed at the present, of the searched co-occurrence pair, and adds the generated co-occurrence group to a co-occurrence group table (A34). Note that the co-occurrence group table is a table configured to associate a co-occurrence group ID with a message ID belonging to the co-occurrence group ID.

Next, the information processing apparatus searches out the co-occurrence pair recursively with the added message being set as an origin (A35). For instance, such a case is assumed that before the process in A34, a co-occurrence group GX contains message IDs=MSG1, MSG2, and message IDs=MSG2, MSG3 are searched out as the co-occurrence pair in the processes A32, A33. In this assumption, the information processing apparatus adds the message ID=MSG3 to the co-occurrence group GX in the process of A34. Then the information processing apparatus invokes the message pair joining process recursively by setting the co-occurrence pair containing the message ID=MSG3 as the origin in the process of A35. This recursive invoke enables the information processing apparatus to execute grouping the message pairs based on the message (message ID=MSG3) newly added in A32-A34 and to generate a further large message group.

Whereas when determining in S33 that another co-occurrence pair is not searched out, the co-occurrence analyzing unit determines whether all of the co-occurrence pairs are evaluated or not (A36). When the co-occurrence pair not yet evaluated exists, the co-occurrence analyzing unit loops the processing back to A31. While on the other hand, when all of the co-occurrence pairs are evaluated, the co-occurrence analyzing unit finishes the message pair joining process.

Figure 23:
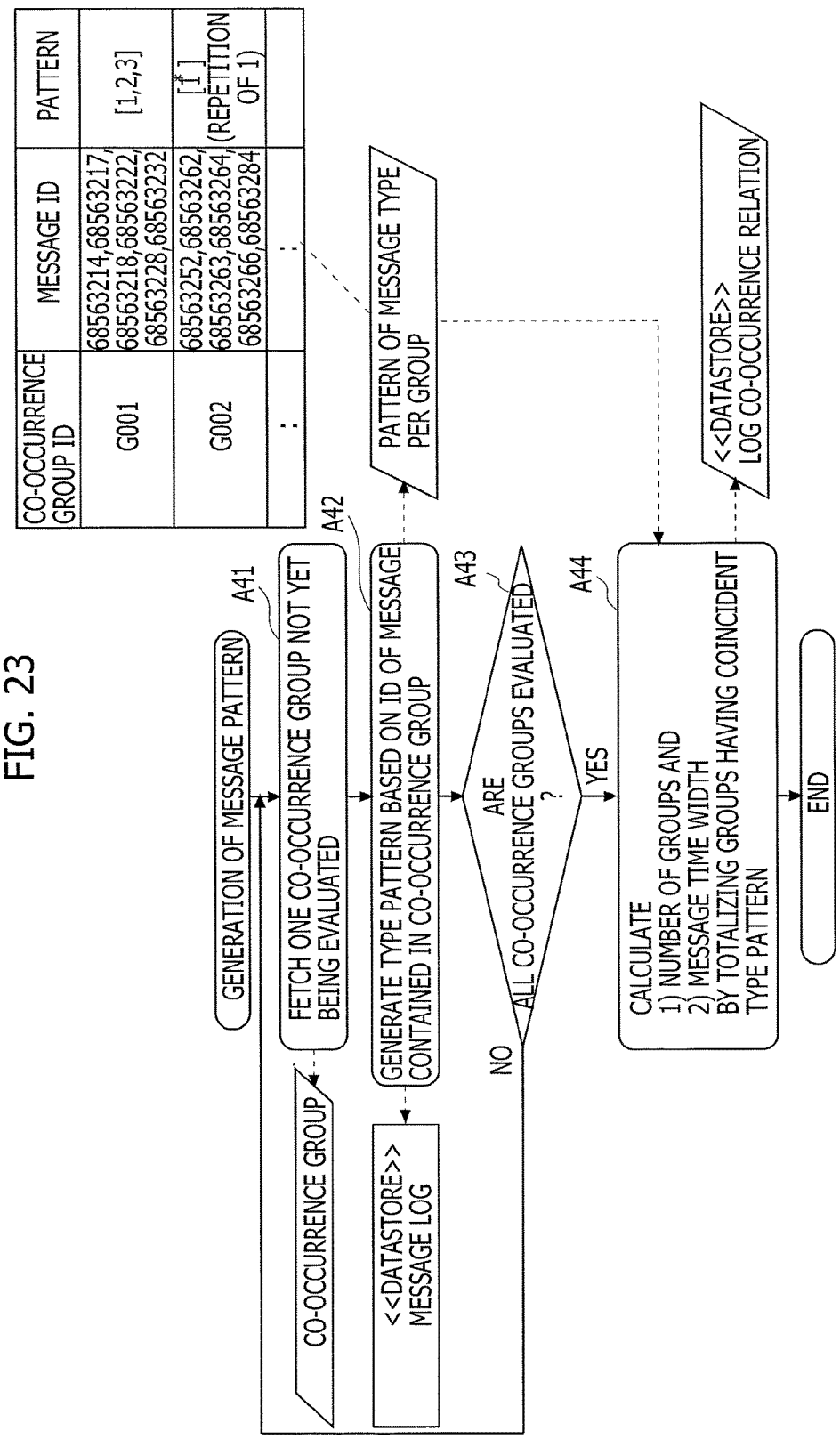
FIG. 23 is a flowchart illustrating in detail how a message pattern is generated.

FIG. 23 is a flowchart illustrating in detail how the message pattern is generated (A4 in FIG. 20). FIG. 23 illustrates processes of extracting message types contained in the co-occurrence group generated in the message pair joining process in FIG. 22, and generating the message pattern defined a relation between the message types.

In these processes, the information processing apparatus fetches one co-occurrence group not yet evaluated from the co-occurrence groups retained on the main storage unit 12 (A41). The information processing apparatus generates a type pattern based on the IDs of the messages contained in the co-occurrence group (A42). Herein, the message pattern [1, 2, 3] is generated with respect to, e.g., the co-occurrence group ID=0001 when the message IDs and message types are given by ID=68563214 (type=1), ID=68563217 (type=1), ID=68563218 (type=1), ID=68563222 (type=2), ID=68563228 (type=3), and ID=68563232 (type=3).

Subsequently, the information processing apparatus determines whether all of the co-occurrence groups are evaluated or not (S43). When the co-occurrence group not yet evaluated exists, the co-occurrence analyzing unit loops the processing back to A41. Whereas when all of the co-occurrence groups are evaluated, the co-occurrence analyzing unit aggregates the groups exhibiting the coincident type pattern, and generates the message pattern from the aggregated groups. Further, the co-occurrence analyzing unit calculates a number of message patterns (1) defined as the aggregated groups, and also calculates a message time width (2) (A44). Then, the co-occurrence analyzing unit retains the message patterns and the message time width as the log co-occurrence relation on the main storage unit 12.

Figure 24:
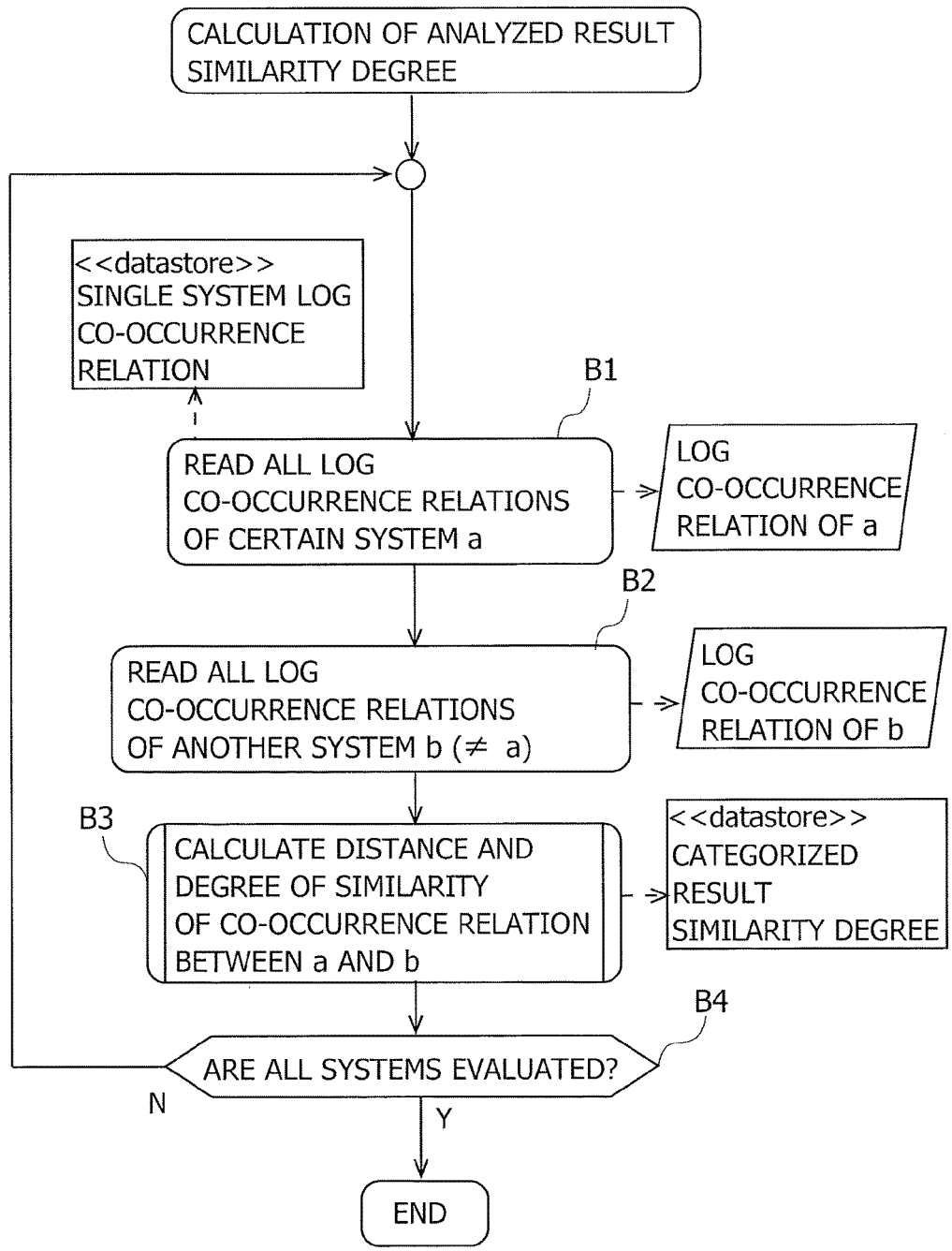
FIG. 24 is a flowchart illustrating processes of an analysis result/similarity calculation unit 22.

FIG. 24 is a flowchart illustrating processes of the analysis result/similarity calculation unit 22. The analysis result/similarity calculation unit 22 reads the single system log co-occurrence relation as the processing result of the single system log co-occurrence analyzing unit 20 (B1). The single system log co-occurrence relation is generated per single system. In B1, the analysis result/similarity calculation unit 22 reads the single system log co-occurrence relation of, e.g., the system a.

Next, the analysis result/similarity calculation unit 22 reads the single system log co-occurrence relation of, e.g., the system b (B2). Subsequently, the analysis result/similarity calculation unit 22 calculates a distance and a degree of similarity of the co-occurrence relation between the system a and the system b (B3). The analysis result/similarity calculation unit 22 retains the calculated degree of similarity as a degree of similarity of the categorized result (see FIG. 17) on the main storage unit 12. The analysis result/similarity calculation unit 22 determines whether the evaluations about all of the systems are made or not (B4). The analysis result/similarity calculation unit 22, when the evaluations about all of the systems are not made, loops the processing back to B1. The process in B3 is one instance of generating value information representing a degree of similarity in operation between the systems. The degree of similarity calculated in the process of B3 is one instance of value information representing the degree of similarity in operation between the systems. Further, the process in B3 is one instance of generating value information representing the degree of similarity in operation between a first system and a second system, based on a comparison of an occurrence status between a message type extracted from a first log associated with the first system and a message type extracted from a second log associated with the second system.

Figure 25:
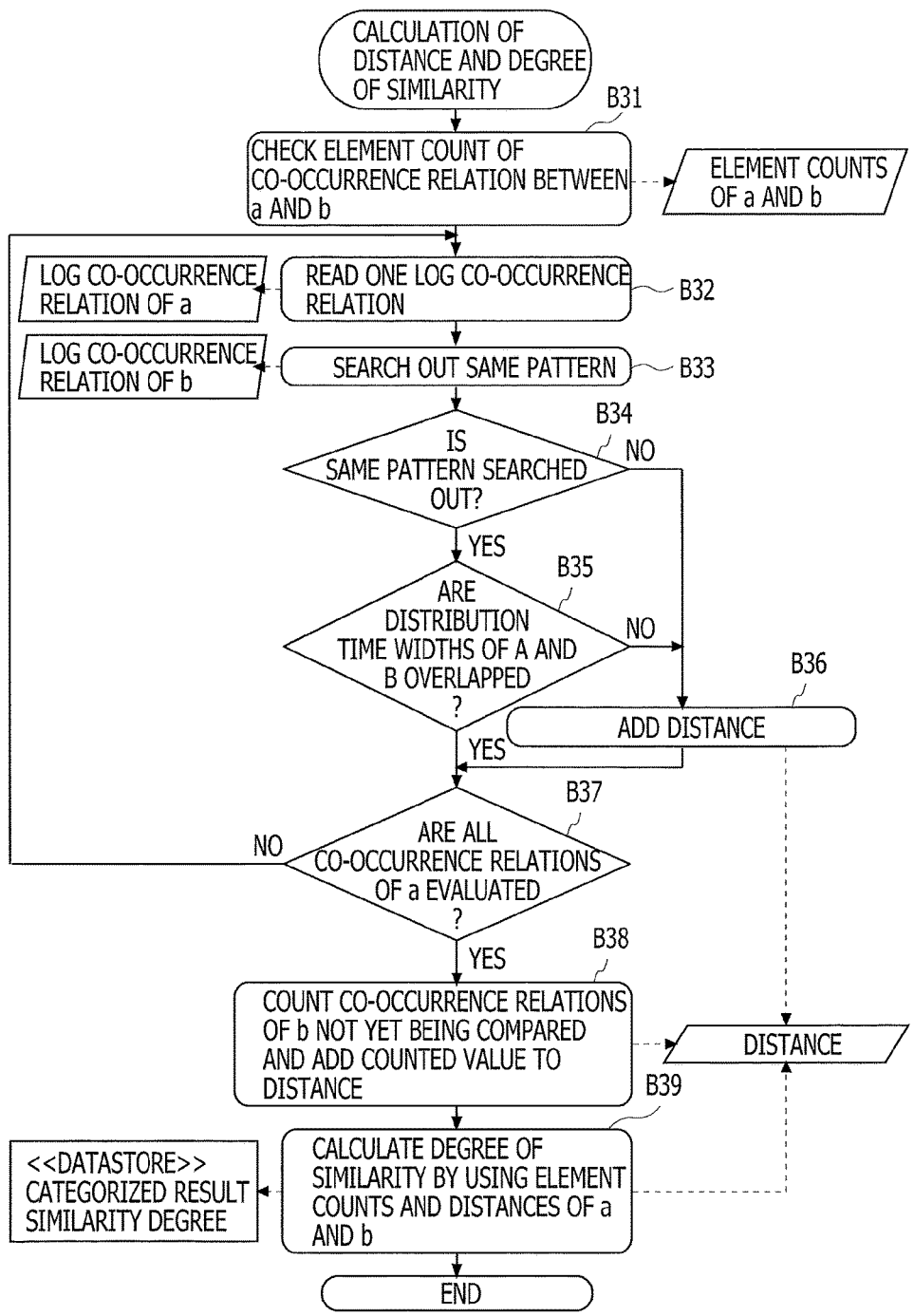
FIG. 25 is a flowchart illustrating in detail a process of calculating a distance and a degree of similarity.

FIG. 25 is a flowchart illustrating in detail the process of calculating the distance and the degree of similarity. The processes for the system a and the system b will hereinafter be described. In this process, the analysis result/similarity calculation unit 22 checks an element count of the co-occurrence relation between the system a and the system b, and retains the element count on the main storage unit 12 (B31). Next, the analysis result/similarity calculation unit 22 reads one log co-occurrence relation of the system a (B32). The analysis result/similarity calculation unit 22 searches out the same co-occurrence relation as the co-occurrence relation read in B32 from within the co-occurrence relations of the system b (B33).

Subsequently, the analysis result/similarity calculation unit 22 determines whether the same co-occurrence relation as the co-occurrence relation read in B32 is searched out in within the co-occurrence relations of the system b (B34). When determining in B34 that the same co-occurrence relation is searched out, the analysis result/similarity calculation unit 22 determines whether the co-occurrence relation distribution time width of the same co-occurrence relation of the system a is overlapped with the distribution time width of the system b (B35). When the determination in B34 or B35 results in negation (N), i.e., when the same co-occurrence relation is not searched out, or when the co-occurrence relation distribution time widths are not overlapped, the analysis result/similarity calculation unit 22 adds "1" to the distance between the system a and the system b (B36).

Whereas when determining in B34 that the same co-occurrence relation is searched out and that the co-occurrence relation distribution time widths are overlapped, the analysis result/similarity calculation unit 22 advances the processing to B37 without adding "1" to the distance between the system a and the system b. Subsequently, the analysis result/similarity calculation unit 22 determines whether all of the co-occurrence relations of the system a are evaluated or not (B37). The analysis result/similarity calculation unit 22 loops the processing back to B32 when all of the co-occurrence relations of the system a are not evaluated. Whereas when all of the co-occurrence relations of the system a are evaluated, the analysis result/similarity calculation unit 22 counts the co-occurrence relations of the system b, which are not yet compared, and a co-occurrence relation count to the distance (B38).

Subsequently, the analysis result/similarity calculation unit 22 calculates the degree of similarity by using the element counts and the distances of the system a and the system b (B39). Herein, the degree of similarity is defined in, e.g., the mathematical expression 2. The analysis result/similarity calculation unit 22 retains the calculated degree of similarity as the degree of similarity of the categorized result (FIG. 17) on the main storage unit 12. The processes in B34, B35 and B39 are one instance of generating the value information representing the degree of similarity in operation between the first system and the second system. A value of the distance added in the process of B36 when determining in B34 that the same co-occurrence relation is not searched out, is one instance of a degree of similarity or dissimilarity between the message types. Moreover, a value of distance added in the process of B36 when determining in B35 that the co-occurrence relation distribution time widths are not overlapped, is one instance of a degree of similarity or dissimilarity between occurrence time characteristics containing a time interval of repetition of one type of message or a time interval for co-occurrence of plural types of messages. Incidentally, it does not, however, mean that the degree of similarity is limited to the definition in the mathematical expression 2, and the analysis result/similarity calculation unit 22 may simply set, as the degree of similarity, an integrated value of the distance between the system a and the system b, an average value of the distance between the system a and the system b by use of a weighting coefficient, and other equivalent values.

Figure 26:
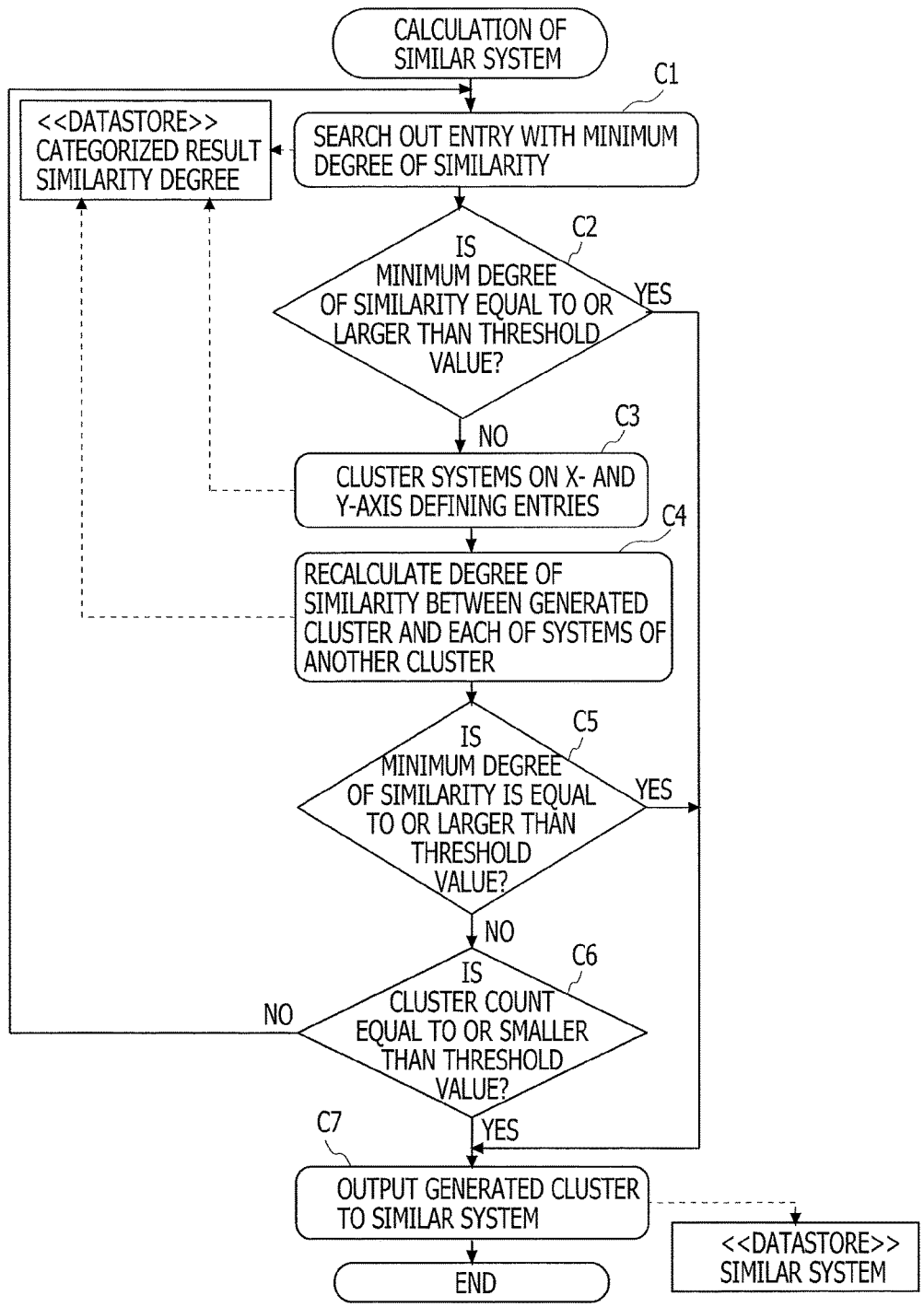
FIG. 26 is a flowchart illustrating a similar system calculation process.

FIG. 26 is a flowchart illustrating processes of the similar system calculation unit 24. In these processes, the similar system calculation unit 24 searches for an entry with a minimum degree of similarity from the degrees of similarity of categorized results (FIG. 17), which are generated in the process of the analysis result/similarity calculation unit 22 (C1). Next, the similar system calculation unit 24 determines whether a value of the minimum degree of similarity searched out in C1 is equal to or larger than a threshold value or not (C2). The value of the degree of similarity being smaller than the threshold value implies that the two systems a and beach having the degree of similarity associated with the entry searched out in C1, are similar to each other. Then, when the determination in C2 results in affirmation (YES), the similar system calculation unit 24 clusters the systems a and b on the X- and Y-axes located at the entries during the processing of the degree of similarity of the categorized result (FIG. 17) (C3). The process in C3 is one instance of executing a process of clustering the first system and the second system when the value information satisfies predetermined criteria.

Next, the similar system calculation unit 24 recalculates the degree of similarity between the cluster generated in C3 and another cluster, or the degree of similarity between the cluster generated in C3 and each of the systems not being set as a clustering target system (C4). The process in C4 is one instance of generating value information representing a degree in operation between generated clusters, or between the generated cluster and a system not being set as a clustering target system. The processes in C5, C6 and C3 are one instance of further executing the clustering process between the generated clusters, or between the generated cluster and the system not being set as the clustering target system when the generated value information satisfies the predetermined criteria.

Subsequently, the similar system calculation unit 24 determines whether the recalculated degree of similarity is equal to or larger than a threshold value or not (C5). When determining in C5 that the recalculated degree of similarity is equal to or larger than the threshold value (determination "YES"), the similar system calculation unit 24 advances the processing to C7. Whereas when determining in C5 that the recalculated degree of similarity is smaller than the threshold value (determination "NO"), i.e., when it can be determined that the cluster generated in C3 is similar to each of the systems not being set as a clustering target system, the similar system calculation unit 24 determines whether a cluster count is equal to or larger than a threshold value or not (C6). When determining in C6 that the cluster count is larger than the threshold value (determination "NO"), the similar system calculation unit 24 loops the processing back to C1. Whereas when determining in C5 that the cluster count is equal to or smaller than the threshold value (determination "Y"ES), the similar system calculation unit 24 diverts the processing to C7. Note that when determining in C2 that the value of the minimum degree of similarity is equal to or larger than the threshold value, i.e., none of the similar systems are registered in any entries of the degrees of similarity of the analyzed results, the similar system calculation unit 24 diverts the processing to C7. Then, the similar system calculation unit 24 outputs the generated cluster as the similar systems of the similar system table 23 (FIG. 18) to the main storage unit 12 (C7). The processes in C1-C7 of FIG. 26 are one instance of executing a process of clustering the plurality of systems, based on log-related information.

Figure 27:
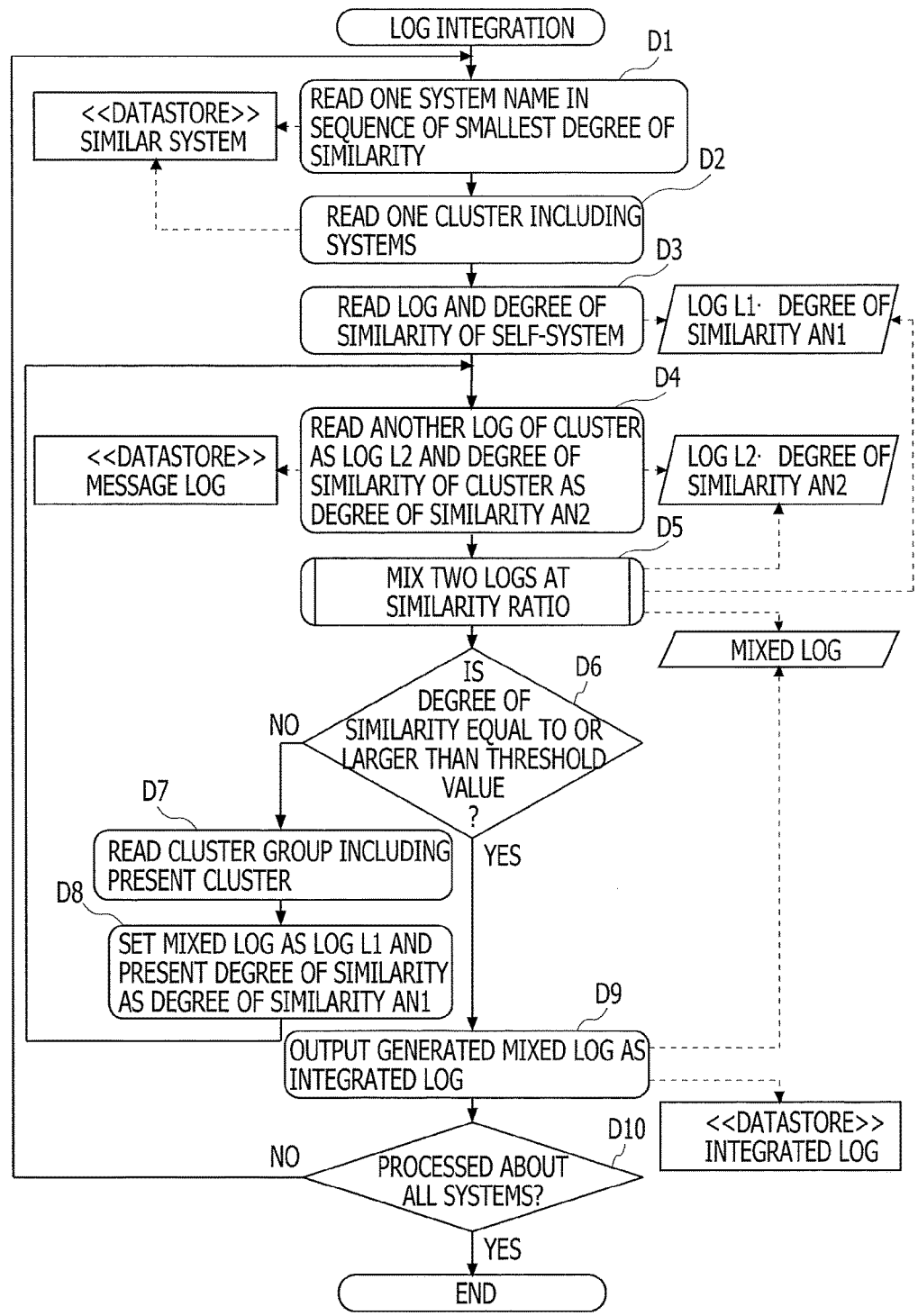
FIG. 27 is a flowchart illustrating processes of a similar system log integration unit.

FIG. 27 is a flowchart illustrating processes of the similar system log integration unit 26. The similar system log integration unit 26 executes a process of mixing the logs between the intra-cluster similar systems in the sequence of the smallest degree of similarity in the similar system table 23. In this process, the similar system log integration unit 26 selects the cluster in the sequence of the smallest degree of similarity, and reads one system name (D1). The system being read in D1 will hereinafter be called a self-system. Next, the similar system log integration unit 26 reads one cluster including the readout self-system (D2). Subsequently, the similar system log integration unit 26 reads the message log and the degree of similarity of the self-system (D3). It is now assumed that "L1" notates the message log and "AN1" notates the degree of similarity of the self-system.

Furthermore, the similar system log integration unit 26 selects another system belonging to the cluster, and reads a log designated by "L2" and a degree of similarity designated by "AN2" of another system being selected (D4). Then, the similar system log integration unit 26 mixes the two logs at a similarity ratio (D5). Next, the similar system log integration unit 26 determines whether the degree of similarity of the cluster being processed at the present is equal to or larger than the threshold value or not (D6). The similar system log integration unit 26, when the degree of similarity of the cluster being processed at the present is smaller than the threshold value, reads the cluster including the present cluster (D7). The similar system log integration unit 26 sets the mixed log being processed at the preset as the log L1 and the present degree of similarity as the degree of similarity AN1 (D8). Then, the similar system log integration unit 26 advances the processing to D4.

Whereas when determining in D6 that the degree of similarity of the cluster being processed at the present is equal to or larger than the threshold value, the similar system log integration unit 26 outputs the generated mixed log as the integrated log to, e.g., the external storage unit 13 (D9). The similar system log integration unit 26 determines whether the logs of all of the systems are processed or not (D10). The similar system log integration unit 26 loops the processing back to D1 when the logs of all of the systems are not yet processed.

Figure 28:
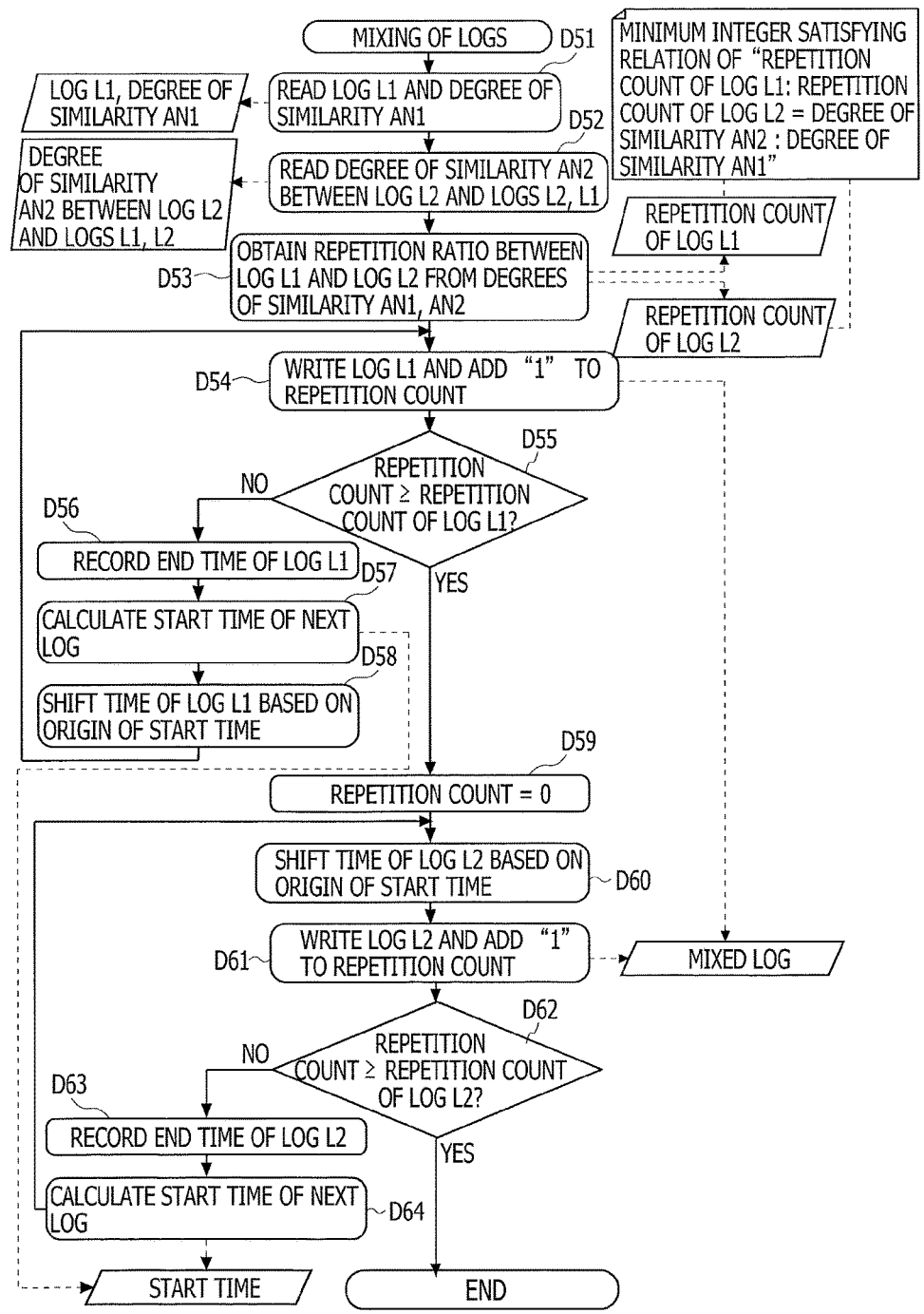
FIG. 28 is a flowchart illustrating in detail a process of mixing two logs at the degree of similarity.

FIG. 28 is a flowchart illustrating in detail the process of mixing the two logs at the similarity ratio (D5 in FIG. 26). In this process, the similar system log integration unit 26 receives the two message logs and the two degrees of similarity, and mixes the two message logs at a ratio of the two degrees of similarity. For instance, the similar system log integration unit 26 reads the log L1 and the degree of similarity AN1 (D51). Next, the similar system log integration unit 26 reads a log L2 and a degree of similarity AN2 between the log 1 and the log 2 (D52). The similar system log integration unit 26 obtains a repetition ratio of the logs L1, L2 from the degrees of similarity AN1, AN2 (D53).

Next, the similar system log integration unit 26 writes the log L1 to the mixed log (D54). The similar system log integration unit 26 determines whether the repetition count is equal to or larger than the repetition count of the log L1 or not (D55). When determining in D55 that the repetition count is smaller than the repetition count of the log L1, the similar system log integration unit 26 records end time of the log L1 (D56). Further, the similar system log integration unit 26 calculates start time of the next log (D57). The similar system log integration unit 26 shifts the time of the log L1 so that the start time calculated in the process of D57 serves as an origin (D58). Subsequently, the similar system log integration unit 26 loops the processing back to D54, and writes again the log L1 to the mixed log.

Whereas when determining in D55 that the repetition count is equal to or larger than the repetition count of the log L1, the similar system log integration unit 26 sets the repetition count to "0" (D59). The similar system log integration unit 26, similarly to D57, calculates the start time of the next log, and shifts the time of the log L2 so that the start time serves as the origin (D60). The similar system log integration unit 26 writes the log L2 to the mixed log, and adds "1" to the repetition count (D61).

Next, the similar system log integration unit 26 determines whether the repetition count is equal to or larger than the repetition count of the log L2 or not (D62). When determining in D62 that the repetition count is smaller than the repetition count of the log L2, the similar system log integration unit 26 records end time of the log L2 (D63). Further, the similar system log integration unit 26 calculates start time of the next log (D64). Then, the similar system log integration unit 26 loops the processing back to D60, and writes again the log L2 to the mixed log. Whereas when determining in D62 that the repetition count is equal to or larger than the repetition count of the log L2, the similar system log integration unit 26 finishes processing.

The processes in D5, D54, D61 are one instance of generating a log substituting for the first log by mixing the first log and the second log. Similarly, the processes in D5, D54, D61 are one instance of generating a log substituting for the second log by mixing the first log and the second log. The processes in D56-D58 and D60-D64 are one instance of mixing the plurality of logs while shifting the message occurrence time so that the occurrence time of one log is not overlapped with the occurrence time of another log.

Figure 29:
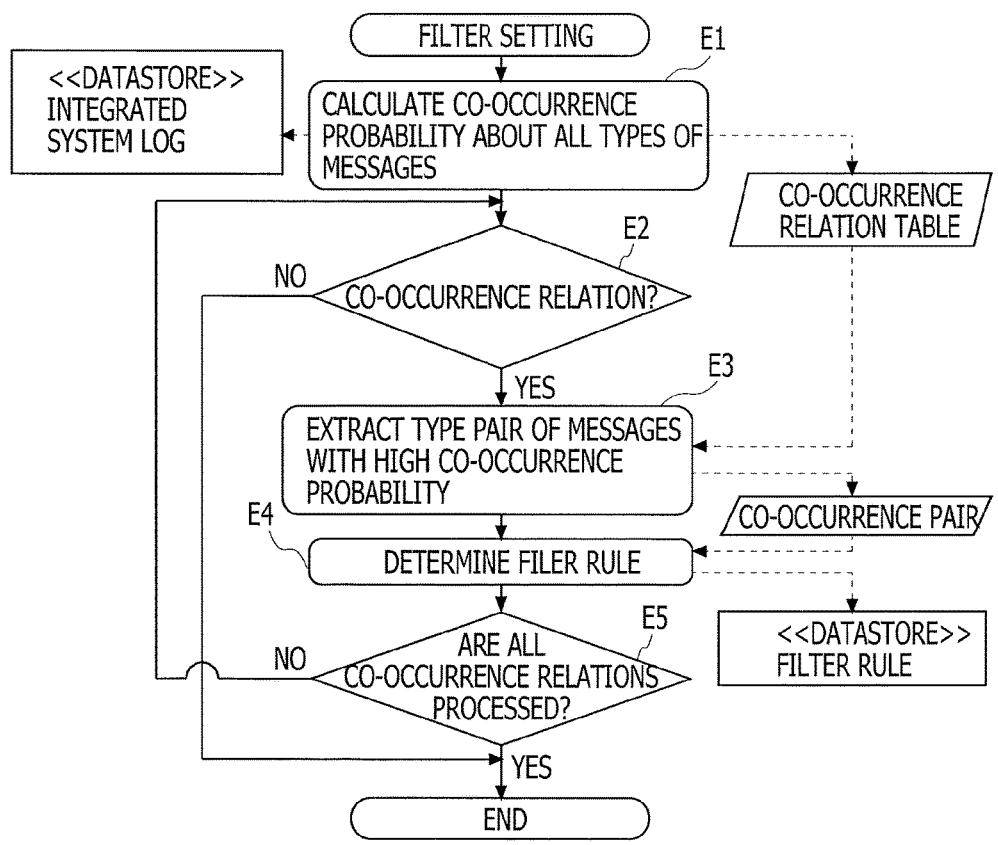
FIG. 29 is a flowchart illustrating processes of a filter setting unit.

FIG. 29 is a flowchart illustrating processes of the filter setting unit 29. The filter setting unit 29, at first, calculates the co-occurrence probability about all of the message types of the processing target integrated system log (E1). The process in E1 is the same as the process in A1 by the co-occurrence analyzing unit. The filter setting unit 29 retains the calculated co-occurrence probability on the main storage unit 12 (co-occurrence probability table). It does not, however, mean that there is a limit to the way of calculating the co-occurrence probability in E1. Simply, the co-occurrence probability may also be calculated per message type pair. The filter setting unit 29 may, as disclosed in, e.g., Japanese Patent Application Laid-Open Publication No. 2014-106851, calculate a value representing the co-occurrence relation, based on a first probability at which a second message type occurs within a first period after the first message has occurred and a second probability at which a first message type occurs within a second period before the second message occurs, and may sets this calculated value as the co-occurrence probability. Herein, the filter setting unit 29 may also calculate the co-occurrence probability, based on an average of the first probability and the second probability.

Next, the filter setting unit 29 determines whether or not the co-occurrence relation table registering the calculated result of the co-occurrence probability in E1 has an entry, i.e., whether the co-occurrence relation exists or not (E2). When determining in E2 that the co-occurrence relation exists, the filter setting unit 29 extracts a type pair of the messages with the co-occurrence probability being higher than the predetermined value form the message log (E3). In the process of E3, the co-occurrence analyzing unit, when the co-occurrence probability of the type pair of the messages in the entry, of which the existence is confirmed in E2, is higher than the threshold value, extracts the type pair in the entry being processed, and retains the extracted type pair as a co-occurrence pair on the main storage unit 12.

Next, the filter setting unit 29 determines the filter rule (E4). The filter setting unit 29 retains the determined co-occurrence group on the main storage unit 12. It does not, however, mean that there is a limit to the way of determining the filter rule in the process of E4. For instance, the filter setting unit 29 may adopt a filter rule of ignoring and excluding, upon detecting one type of the type pair, this one type from the monitoring target events. The filter setting unit 29 may further adopt another filter rule of aggregating, upon detecting any one type of the type pairs, this one type into generic messages and excluding the message being issued a plural number of times from the monitoring target events. Then, the similar system log integration unit 26 determines whether all of the co-occurrence relations are processed or not (E5). The filter setting unit 29, when there is still an unprocessed co-occurrence relation, loops the processing back to E1. The processes in E1-E5 of FIG. 29 are one instance of generating a rule of extracting a message.

Effects of Embodiment

As discussed above, the information processing apparatus according to the Example clusters the plurality of systems of the monitoring target system, and obtains the integrated system log co-occurrence relation about the clustered systems. Accordingly, even when a small quantity of messages to be processed by, e.g., the single system log co-occurrence analyzing unit 20 are output from the individual systems, the integrated system log co-occurrence analyzing unit 27 can generate the integrated system log co-occurrence relation 28 by substantially increasing the message quantity through the clustered systems. Consequently, the filter setting unit 29 can generate the filter rule by use of the integrated system log co-occurrence relation 28 as a resultant relation by substantially increasing the message quantity, thereby enabling the accuracy of the filter rule to be improved more than using the single system log co-occurrence 21. As a result, at a substantially early stage of operating the monitoring target system, the filter setting unit 29 can reduce the overlapped messages and the plurality of messages occurring due to the same cause by applying the filter to the messages issued from the monitoring target system.

In particular, the single system log co-occurrence analyzing unit 20 of the information processing apparatus generates the message pair, based on the co-occurrence rule of the message types with the co-occurrence probability being equal to or larger than the predetermined value in the message logs form the plurality of systems of the monitoring target system. The single system log co-occurrence analyzing unit 20 generates the single system log co-occurrence relation 21 containing the message pattern generated by combining the message types and the occurrence time interval by organizing the messages into the group. Further, the analysis result/similarity calculation unit 22 of the information processing apparatus calculates the degree of similarity by obtaining the distance between the systems, based on the single system log co-occurrence relation 21. Accordingly, the information processing apparatus can extract the systems being similar in behavior from within the systems of the monitoring target system, based on the evaluation index, i.e., the degree of similarity. In other words, the single system log co-occurrence analyzing unit 20 can calculate the degree of similarity, based on the comparison of the occurrence status of the message type between the single systems.

The analysis result/similarity calculation unit 22 of the information processing apparatus uses the similarity or dissimilarity of the message types and the repetition time interval of one type of message or the time interval for the co-occurrence of the plural types of messages in order to calculate the distance between the systems. The analysis result/similarity calculation unit 22 can therefore perform the evaluations related to generating the filter rule based on the message co-occurrence probability as the behavior of each of the systems of the monitoring target system.

The similar system calculation unit 24 of the information processing apparatus recalculates the degree of similarity between the generated clusters or between the generated cluster and the system not being set as the clustering target system, and performs clustering when the value of the degree of similarity is smaller than the threshold value. Accordingly, the similar system calculation unit 24 can, when the value of the degree of similarity between the systems is smaller than the threshold value, enhance a possibility of generating a much larger cluster. The similar system calculation unit 24 can further execute clustering within a range of a fixed or larger cluster count by determining whether the cluster count is equal to or smaller than the threshold value.

The similar system log integration unit 26 of the information processing apparatus mixes the message logs while varying the ratio of the message log quantity in accordance with the degree of similarity of the self-system being set as the clustering target system and the degree of similarity between the self-system and the peer system being set as the clustering target system. Such an effect is therefore produced as to lessen the density of the message logs of the peer system, corresponding to the degree of similarity between the self-system and the peer system being set as the clustering target system, and it is feasible to reduce the side effect caused by mixing the message logs.

The similar system log integration unit 26 of the information processing apparatus mixes the message logs by shifting the message occurrence time so as not to overlap the occurrence time of one log with the occurrence time of another log when mixing the plurality of message logs. The co-occurrence relation not existing before mixing is restrained from occurring due to mixing the message logs.

<<Non-Transitory Computer Readable Recording Medium>>

A program configured to cause a computer, other machines and apparatuses (which will hereinafter be referred to as the computer and other equivalent apparatuses) to attain any one of the processes, can be recorded on a non-transitory recording medium readable by the computer and other equivalent apparatuses. Then, the computer and other equivalent apparatuses are made to read and execute the program on this non-transitory recording medium, whereby the function thereof can be provided.

Herein, the non-transitory recording medium readable by the computer and other equivalent apparatuses connotes a non-transitory recording medium capable of accumulating information instanced by data, programs and other equivalent information electrically, magnetically, optically, mechanically or by chemical action, which can be read from the computer and other equivalent apparatuses. Among these non-transitory recording mediums, the mediums removable from the computer and other equivalent apparatuses are exemplified by a flexible disc, a magneto-optic disc, a CD-ROM, a CD-R/W, a DVD, a Blu-ray disc, a DAT, an 8 mm tape, and a memory card like a flash memory. Further, a hard disc, a ROM (Read-Only Memory) and other equivalent recording mediums are given as the non-transitory recording mediums fixed within the computer and other equivalent apparatuses. Still further, a solid state drive (SSD) is also available as the non-transitory recording medium removable from the computer and other equivalent apparatuses and also as the non-transitory recording medium fixed within the computer and other equivalent apparatuses.

The information processing apparatus according to the Example can start applying the filter rule at the much earlier stage when monitoring the messages.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A filter rule generation apparatus, comprising:
a storage unit configured to store instructions; and
a processor, in accordance with each of the instructions stored on the storage unit, executing a process that causes the filter rule generation apparatus to perform:
extracting a co-occurrence message group per system, based on a co-occurrence probability, from a plurality of logs in which messages are accumulated, the messages being generated within systems;
first generating value information representing a degree of similarity in operation between the systems, based on the extracted co-occurrence message group;
clustering the systems, based on the value information;

second generating a rule for extracting messages from the logs of the systems included in each cluster, based on the co-occurrence message group in the cluster generated by the clustering;

selecting a monitoring target event based on applying the rule to extract messages from the logs of the systems included in each cluster; and outputting the monitoring target event.

2. The filter rule generation apparatus according to claim 1, wherein the extracting includes extracting a combination of message types having a co-occurrence probability being equal to or larger than a predetermined value between the message types into which the messages contained in the plurality of logs are categorized, the first generating includes generating the value information representing the degree of similarity in operation between a first system and a second system, based on a comparison of occurrence status between a message type extracted from a first log associated with the first system and a message type extracted from a second log associated with the second system, and the clustering includes clustering the first system and the second system when the generated value information satisfies predetermined criteria.

3. The filter rule generation apparatus according to claim 2, wherein the first generating includes generating the value information representing the degree of similarity in operation between the first system and the second system, based on (a) a degree of similarity or dissimilarity between the message types and (b) a degree of similarity or dissimilarity between occurrence time characteristics containing a time interval of repetition of one type of message or a time interval for co-occurrence of plural types of messages in the message type extracted from the first log associated with the first system and the message type extracted from the second log associated with the second system.

4. The filter rule generation apparatus according to claim 1, wherein the first generating includes generating value information representing a degree in operation between the generated clusters, or between the generated cluster and a system not being set as a clustering target system, the clustering further includes clustering between the generated clusters, or between the generated cluster and the system not being set as the clustering target system when the generated value information satisfies the predetermined criteria.

5. The filter rule generation apparatus according to claim 1, wherein the clustering includes:

third generating includes generate a log substituting for the first log by mixing the first log and the second log at a ratio based on one item of value information generated for the first log occurring in the first system and mutual value information generated between the first log and the second log occurring in the second system; and fourth generating a log substituting for the second log by mixing the first log and the second log by mixing the first log and the second log at a ratio based on the one item of value information generated for the second log and the mutual value information generated between the first log and the second log in the clustering process.

6. The filter rule generation apparatus according to claim 1, wherein the clustering includes mixing the plurality of logs while shifting the message occurrence time so that the occurrence time of one log is not overlapped with the occurrence time of another log in the clustering process.

7. A filter rule generation method, comprising:

extracting a co-occurrence message group per system, based on a co-occurrence probability, from a plurality of logs in which messages are accumulated, the messages being generated within systems, first generating value information representing a degree of similarity in operation between the systems from the extracted co-occurrence message group;

clustering the plurality of systems, based on the value information;

second generating a rule for extracting messages from the logs of the systems included in each cluster, based on the co-occurrence message group in the cluster generated by the clustering process;

selecting a monitoring target event based on applying the rule to extract messages from the logs of the systems included in each cluster; and outputting the monitoring target event.

8. The filter rule generation method according to claim 7, wherein the extracting includes extracting a combination of message types having a co-occurrence probability being equal to or larger than a predetermined value between the message types into which the messages contained in the plurality of logs are categorized, the first generating includes generating the value information representing the degree of similarity in operation between a first system and a second system, based on a comparison of occurrence status between a message type extracted from a first log associated with the first system and a message type extracted from a second log associated with the second system; and the clustering includes clustering the first system and the second system when the value information generated by the analyzing unit satisfies predetermined criteria.

9. The filter rule generation method according to claim 8, wherein the first generating includes generating the value information representing the degree of similarity in operation between the first system and the second system, based on (a) a degree of similarity or dissimilarity between the message types and (b) a degree of similarity or dissimilarity between occurrence time characteristics containing a time interval of repetition of one type of message or a time interval for co-occurrence of plural types of messages in the message type extracted from the first log associated with the first system and the message type extracted from the second log associated with the second system.

10. The filter rule generation method according to claim 7, wherein the first generating includes generating value information representing a degree in operation between the generated clusters, or between the generated cluster and a system not being set as a clustering target system, and the clustering further includes clustering between the generated clusters, or between the generated cluster and the system not being set as the clustering target system when the generated value information satisfies the predetermined criteria.

11. The filter rule generation method according to claim 7, wherein the clustering includes:

third generating a log substituting for the first log by mixing the first log and the second log at a ratio based on one item of value information generated for the first log occurring in the first system and mutual value information generated between the first log and the second log occurring in the second system; and fourth generating a log substituting for the second log by mixing the first log and the second log by mixing the first log and the second log at a ratio based on one item of value information generated for the second log and the mutual value information generated between the first log and the second log.

12. The filter rule generation method according to claim 7, wherein the clustering includes mixing the plurality of logs while shifting the message occurrence time so that the occurrence time of one log is not overlapped with the occurrence time of another log.

13. A non-transitory computer-readable recording medium having stored therein a filter rule generation program of a filter rule generation apparatus including a processor, the filter rule generation program to cause the processor to perform:

extracting a co-occurrence message group per system, based on a co-occurrence probability, from a plurality of logs in which messages are accumulated, the messages being generated within systems, first generating value information representing a degree of similarity in operation between the systems from the extracted co-occurrence message group;

clustering the plurality of systems, based on the value information;

second generating a rule for extracting messages from the logs of the systems included in each cluster, based on the co-occurrence message group in the cluster generated by the clustering process;

selecting a monitoring target event based on applying the rule to extract messages from the logs of the systems included in each cluster; and outputting the monitoring target event.

14. The non-transitory computer-readable recording medium having stored therein a filter rule generation program according to claim 13, wherein the extracting includes extracting a combination of message types having a co-occurrence probability being equal to or larger than a predetermined value between the message types into which the messages contained in the plurality of logs are categorized, the first generating includes generating the value information representing the degree of similarity in operation between a first system and a second system, based on a comparison of occurrence status between a message type extracted from a first log associated with the first system and a message type extracted from a second log associated with the second system, and the clustering includes clustering the first system and the second system when the generated value information satisfies predetermined criteria.

15. The non-transitory computer-readable recording medium having stored therein a filter rule generation program according to claim 14, wherein the first generating includes generating the value information representing the degree of similarity in operation between the first system and the second system, based on (a) a degree of similarity or dissimilarity between the message types and (b) a degree of similarity or dissimilarity between occurrence time characteristics containing a time interval of repetition of one type of message or a time interval for co-occurrence of plural types of messages in the message type extracted from the first log associated with the first system and the message type extracted from the second log associated with the second system.

16. The non-transitory computer-readable recording medium having stored therein a filter rule generation program according to claim 13, wherein the first generating includes generating value information representing a degree in operation between the generated clusters, or between the generated cluster and a system not being set as a clustering target system, and the clustering further includes clustering between the generated clusters, or between the generated cluster and the system not being set as the clustering target system when the generated value information satisfies the predetermined criteria.

17. The non-transitory computer-readable recording medium having stored therein a filter rule generation program according to claim 13, wherein the clustering includes:

third generating a log substituting for the first log by mixing the first log and the second log at a ratio based on one item of value information generated for the first log occurring in the first system and mutual value information generated between the first log and the second log occurring in the second system; and fourth generating a log substituting for the second log by mixing the first log and the second log by mixing the first log and the second log at a ratio based on one item of value information generated for the second log and the mutual value information generated between the first log and the second log in the clustering process.

18. The non-transitory computer-readable recording medium having stored therein a filter rule generation program according to claim 13, wherein the clustering includes mixing the plurality of logs while shifting the message occurrence time so that the occurrence time of one log is not overlapped with the occurrence time of another log.

* * * * *